United States Patent
Suzuki et al.

(10) Patent No.: US 9,317,451 B2
(45) Date of Patent: Apr. 19, 2016

(54) NONVOLATILE SEMICONDUCTOR STORAGE DEVICE HAVING ENCRYPTING ARITHMETIC DEVICE

(71) Applicant: KABUSHIKI KAISHA TOSHIBA, Minato-ku (JP)

(72) Inventors: Toshihiro Suzuki, Tokyo (JP); Noboru Shibata, Kawasaki (JP); Hideo Shimizu, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/592,634

(22) Filed: Jan. 8, 2015

(65) Prior Publication Data

US 2015/0161060 A1 Jun. 11, 2015

Related U.S. Application Data

(63) Continuation of application No. 13/603,707, filed on Sep. 5, 2012, now abandoned.

(30) Foreign Application Priority Data

Dec. 2, 2011 (JP) .................................. 2011-265273

(51) Int. Cl.
*G06F 21/00* (2013.01)
*G06F 12/14* (2006.01)
*G06F 12/02* (2006.01)
(Continued)

(52) U.S. Cl.
CPC ........ *G06F 12/1408* (2013.01); *G06F 11/1068* (2013.01); *G06F 11/1412* (2013.01); *G06F 12/02* (2013.01); *G06F 21/602* (2013.01); *G06F 21/79* (2013.01); *G09C 1/00* (2013.01); *H04L 9/0631* (2013.01); *G06F 12/0246* (2013.01); *G06F 2212/1044* (2013.01); *G06F 2212/1052* (2013.01); *G06F 2212/7203* (2013.01); *H04L 2209/12* (2013.01); *H04L 2209/46* (2013.01)

(58) Field of Classification Search
None
See application file for complete search history.

(56) References Cited

U.S. PATENT DOCUMENTS 7,921,339 B2 * 4/2011 Chen .................... G06F 11/1068
711/103
8,315,098 B2 * 11/2012 Hara ...................... G11C 16/10
365/185.17

(Continued)

FOREIGN PATENT DOCUMENTS

JP 2010-193013 A 9/2010
JP 2011-184938 9/2011

(Continued)

OTHER PUBLICATIONS

Office Action issued May 27, 2014 in Japanese Patent Application No. 2011-265273 (with English translation).

(Continued)

*Primary Examiner* — Shin-Hon Chen
(74) *Attorney, Agent, or Firm* — Oblon, McClelland, Maier & Neustadt, L.L.P.

(57) ABSTRACT

According to one embodiment, a nonvolatile semiconductor storage device includes an encrypting circuit for operating in a predetermined encrypting system, a memory cell array preliminarily storing complementary data to be used in the operation, and a page buffer having a first region for storing the data being read out from the memory cell array, and a second region used when executing the operation.

17 Claims, 32 Drawing Sheets

(51) Int. Cl.
*G06F 11/14* (2006.01)
*G06F 11/10* (2006.01)
*G06F 21/79* (2013.01)
*G09C 1/00* (2006.01)
*H04L 9/06* (2006.01)
*G06F 21/60* (2013.01)
*G06F 11/30* (2006.01)

(56) References Cited

U.S. PATENT DOCUMENTS

| | | | | |
|---|---|---|---|---|
| 2003/0072175 A1* | 4/2003 | Kawamura | ............ | G11C 16/24 365/185.17 |
| 2005/0213378 A1* | 9/2005 | Chang | ............ | G11C 8/12 365/185.03 |
| 2007/0247928 A1* | 10/2007 | Park | ............ | G11C 7/02 365/189.05 |
| 2009/0040826 A1* | 2/2009 | Cha | ............ | G11C 16/20 365/185.09 |
| 2010/0005232 A1* | 1/2010 | Randell | ............ | G06F 11/1068 711/103 |
| 2010/0169546 A1* | 7/2010 | Van Acht | ............ | G06F 9/4812 711/103 |
| 2010/0211852 A1* | 8/2010 | Lee | ............ | G06F 11/1068 714/773 |
| 2011/0161784 A1* | 6/2011 | Selinger | ............ | G06F 11/1068 714/768 |
| 2011/0235431 A1 | 9/2011 | Takagiwa | | |
| 2011/0299339 A1* | 12/2011 | Iwai | ............ | G11C 11/5642 365/185.18 |
| 2011/0310667 A1* | 12/2011 | Iwai | ............ | G11C 16/0483 365/185.11 |

FOREIGN PATENT DOCUMENTS

| | | |
|---|---|---|
| JP | 2011-204298 A | 10/2011 |
| JP | 4991971 | 5/2012 |
| JP | 2013-45072 | 3/2013 |

OTHER PUBLICATIONS

M. Feldhofer, et al., "AES implementation on a grain of sand", IEEE Proceedings Information Security, vol. 152, 2005, pp. 13-20.

* cited by examiner

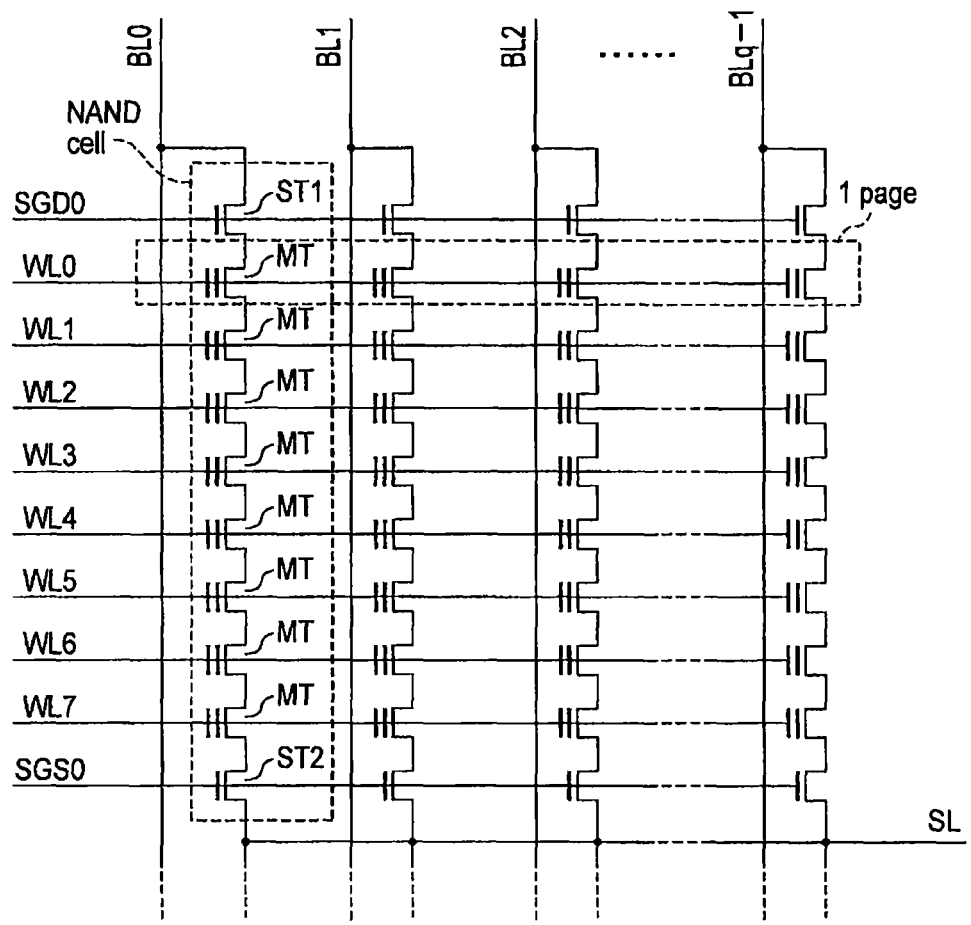
F I G. 4

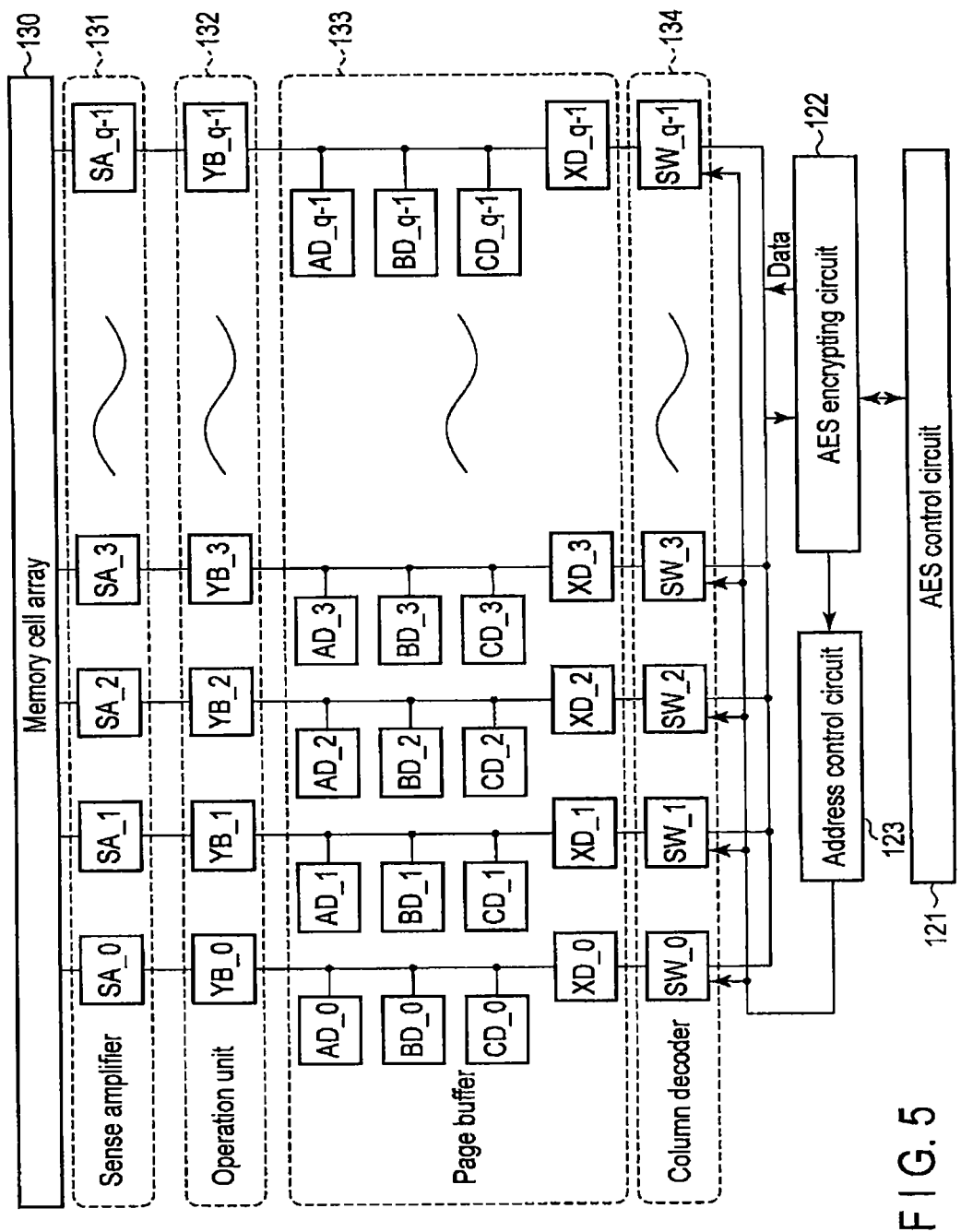
F I G. 5

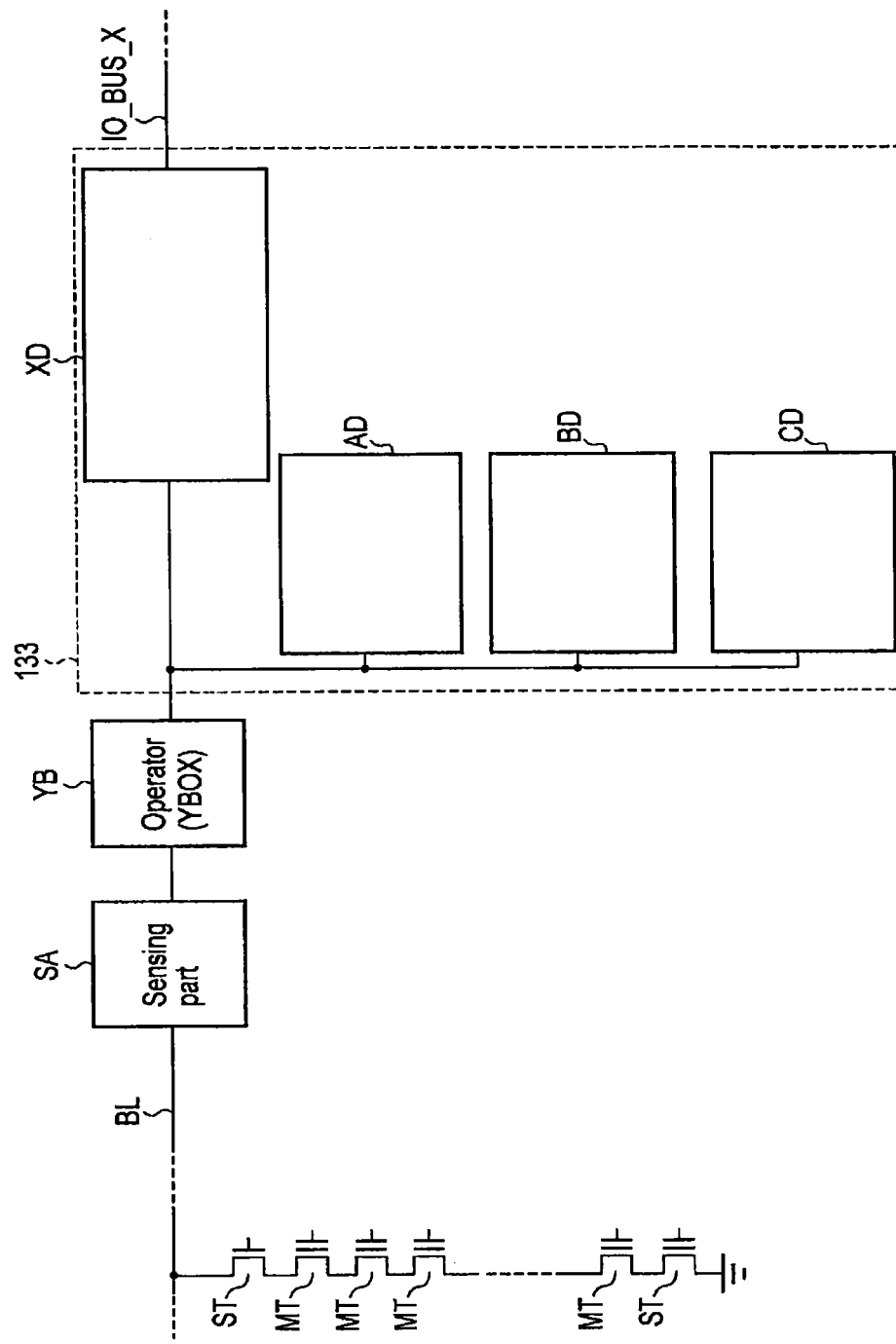
F I G. 6

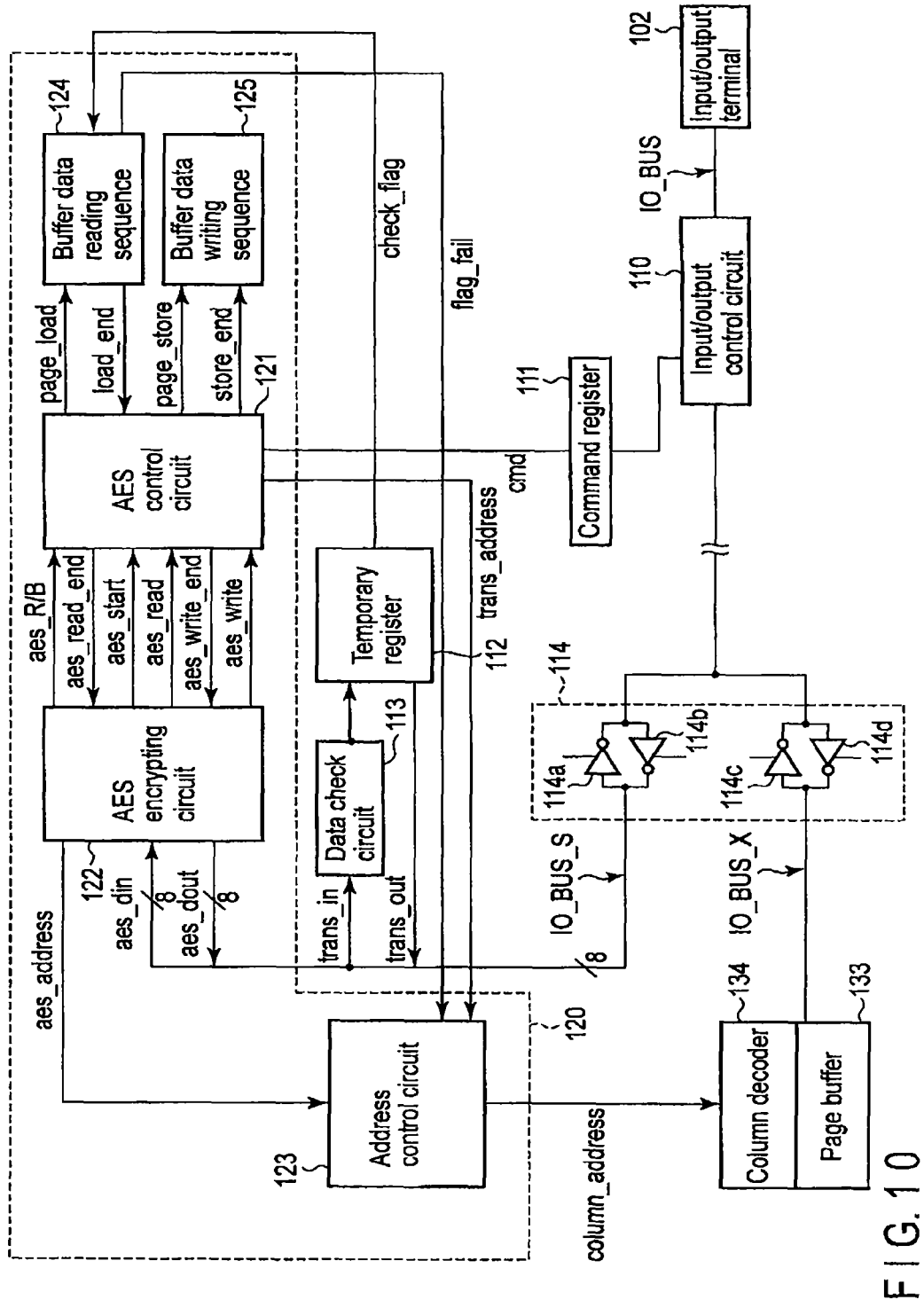
F I G. 10

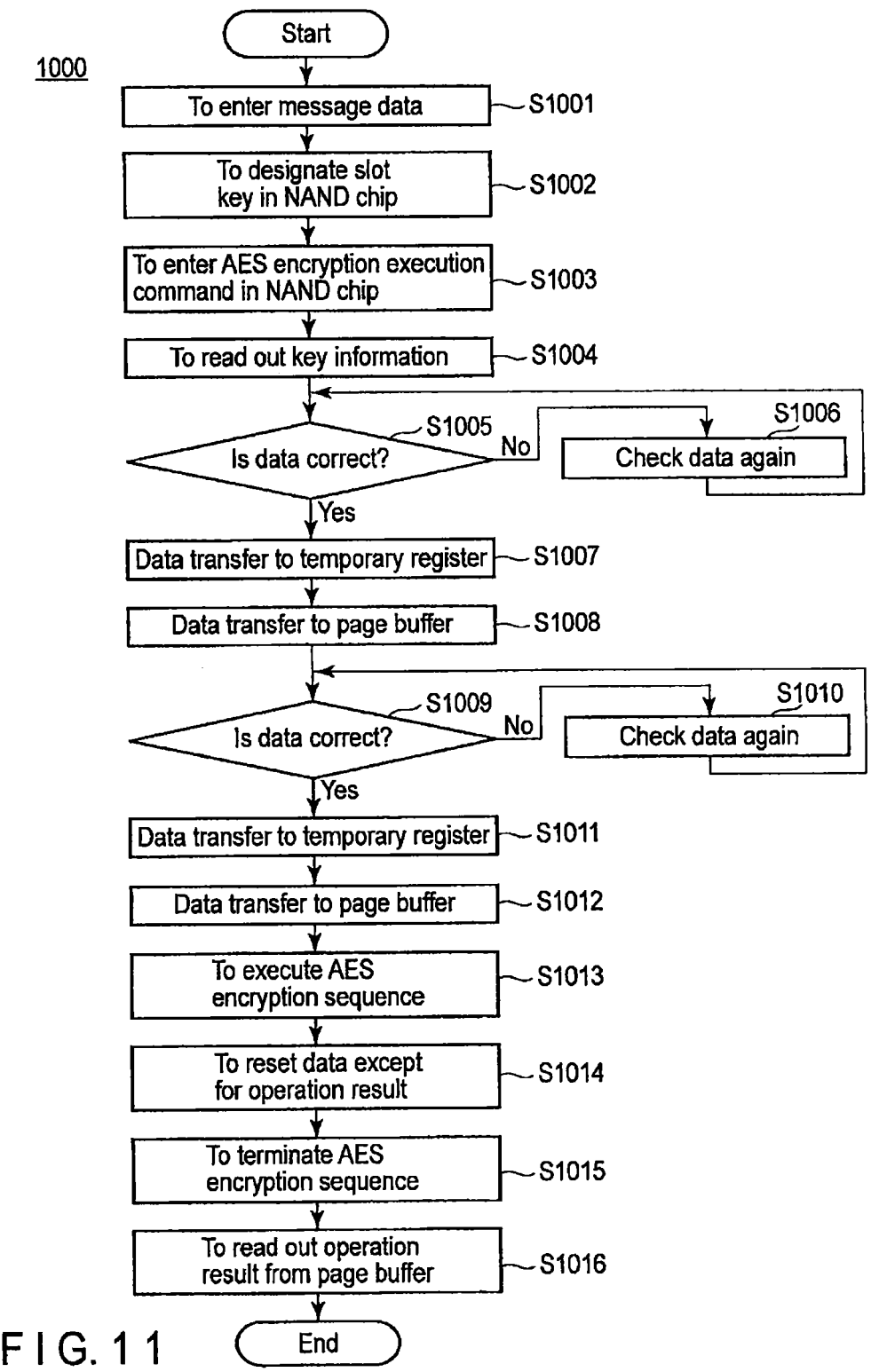
F I G. 11

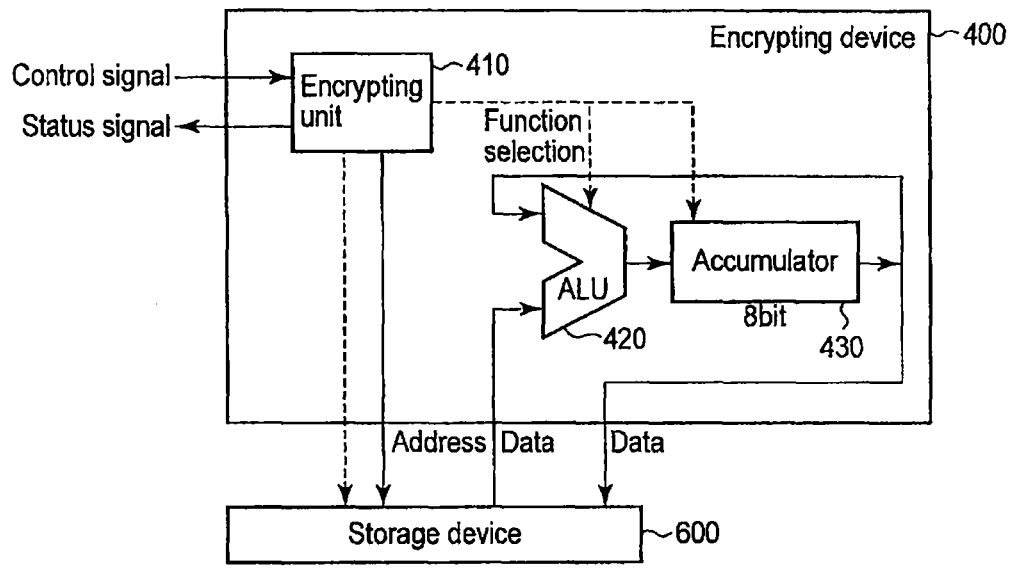

FIG. 19

| Command | Another expression | Description |
|---|---|---|
| ld men | Acc=men | To read out data of storage device at address designated by men into Acc. |
| st men | men=Acc | To write data of Acc into storage device at address designated by men. |
| xor men | Acc=Acc xor men | To write exclusive OR of Acc data and data of storage device at address designated by men. |
| sbox | Acc=SBOX(Acc) | To write result of applying Sbox function in Acc data into Acc. |
| xtime | Acc=XTIME(Acc) | To write result of applying xtime function in Acc data into Acc. |

FIG. 20

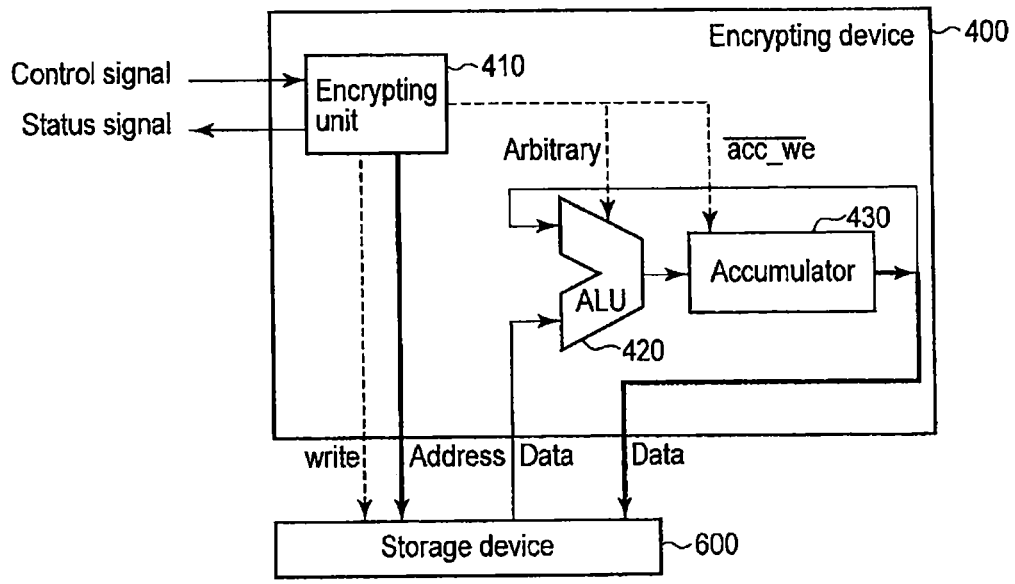
F I G. 23
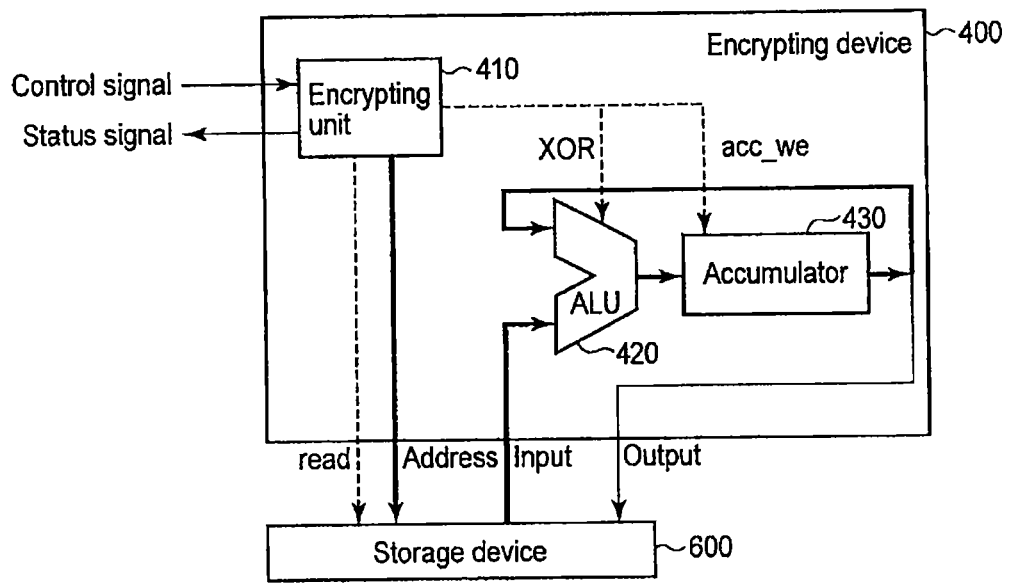
F I G. 24

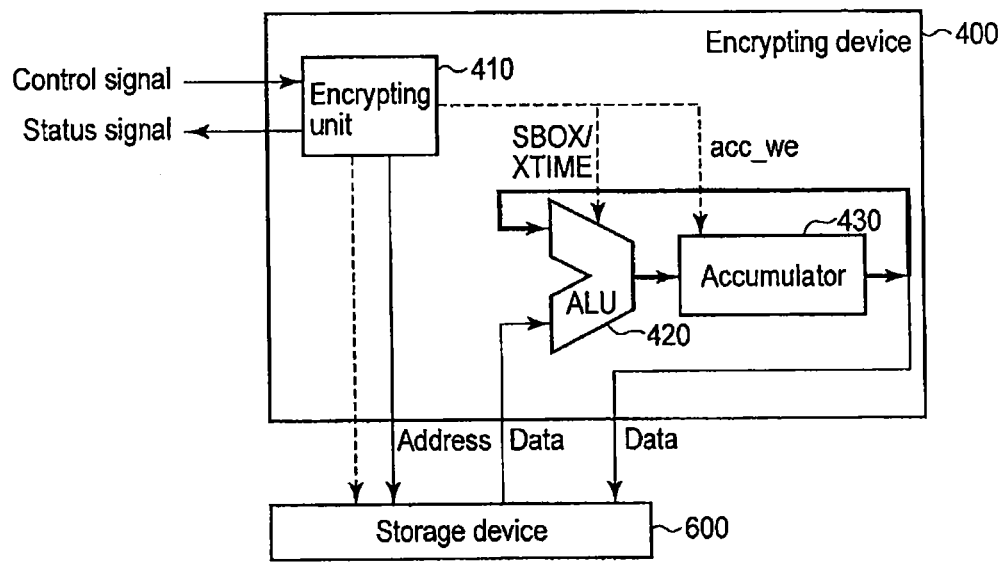
F I G. 2 5
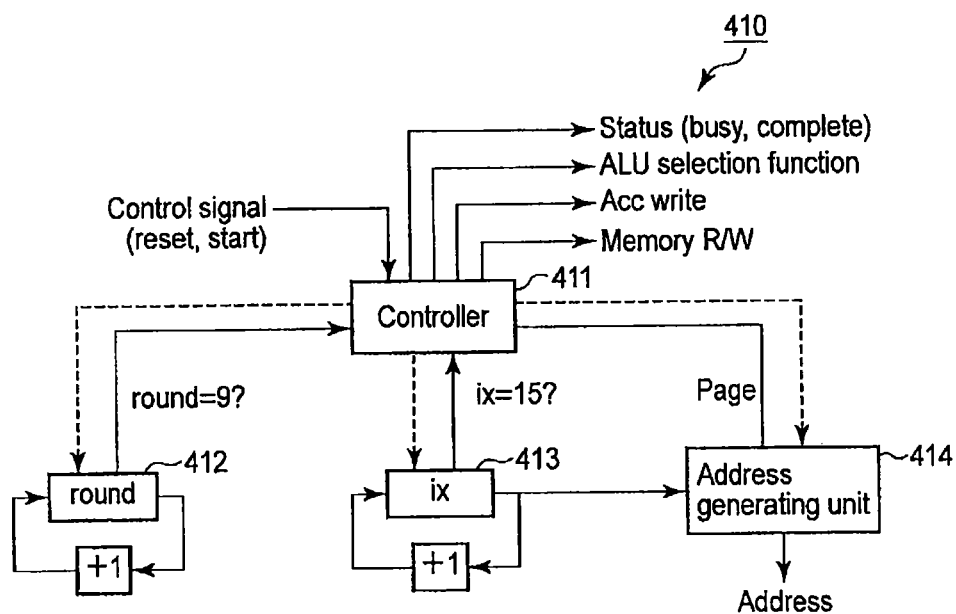
F I G. 2 6

| Address | Data |
|---|---|
| 00 | m[0] |
| 01 | m[0] |
| ⋮ | ⋮ |
| 0F | m[15] |
| 10 | k[0] |
| 11 | k[0] |
| ⋮ | ⋮ |
| 1F | k[15] |
| 20 | w[0] |
| 21 | w[0] |
| ⋮ | ⋮ |
| 2F | w[15] |
| 30 | rc |
| 31 | (vacant) |
|  | (vacant) |
| 3F | (vacant) |

F I G. 2 7

| x | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| kp(x) | 13 | 14 | 15 | 12 | 0 | 1 | 2 | 3 | 4 | 5 | 6 | 7 | 8 | 9 | 10 | 11 |
| sr(x) | 0 | 5 | 10 | 15 | 4 | 9 | 14 | 3 | 8 | 13 | 2 | 7 | 12 | 1 | 6 | 11 |
| ofs1(x) | 1 | 2 | 3 | 0 | 5 | 6 | 7 | 4 | 9 | 10 | 11 | 8 | 13 | 14 | 15 | 12 |
| ofs2(x) | 2 | 3 | 0 | 1 | 6 | 7 | 4 | 5 | 10 | 11 | 8 | 9 | 14 | 15 | 12 | 13 |
| ofs3(x) | 3 | 0 | 1 | 2 | 7 | 4 | 5 | 6 | 11 | 8 | 9 | 10 | 15 | 12 | 13 | 14 |

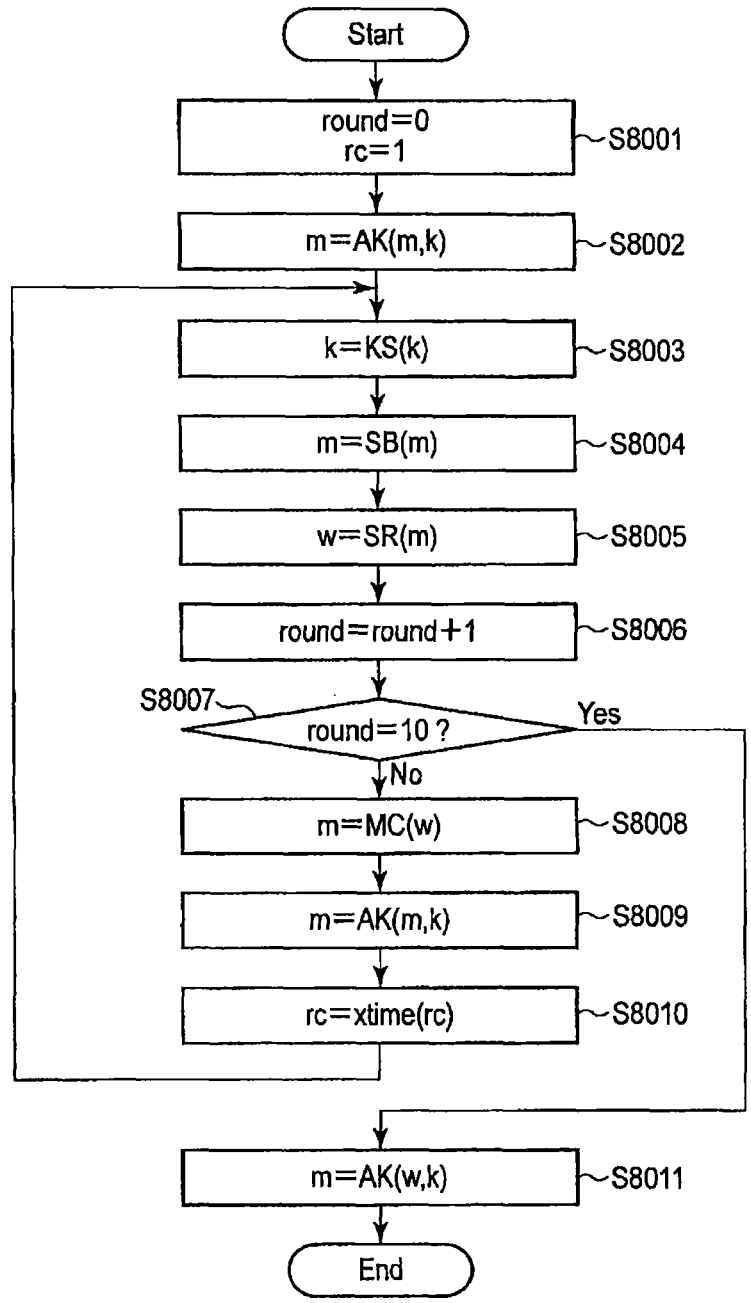
F I G. 3 0

| state | code | read | write | func | acc_we | page | offset | ix | round | Control | Corresponding code |
|---|---|---|---|---|---|---|---|---|---|---|---|
| | | | | | | | | 0 | 0 | | |
| S01 | ld m[i] | 1 | 0 | LD | 1 | PM | ix | | | ↓ | AddRoundKey:m =AK(m,k) |
| S01 | xor k[i] | 1 | 0 | XOR | 1 | PK | ix | | | ↓ | |
| S03 | st m[i] | 0 | 1 | Arbitrary | 0 | PM | ix | ix+1 | | if(ix !=15)S01 | |
| | | | | | | | | 0 | | | |
| S04 | ld k[kp(i)] | 1 | 0 | LD | 1 | PK | kp(ix) | | | if(ix >=4)S07 | KeyExpansion:k =KS(k) |
| S05 | sbox | 0 | 0 | SBOX | 1 | Arbitrary | Arbitrary | | | if(ix !=0)S07 | |
| S06 | xor rc | 1 | 0 | XOR | 1 | PX | 0 | | | ↓ | |
| S07 | xor k[i] | 1 | 0 | XOR | 1 | PK | ix | | | ↓ | |
| S08 | st k[i] | 0 | 1 | Arbitrary | 0 | PK | ix | ix+1 | | if(ix !=15)S04 | |
| | | | | | | | | 0 | | | |
| S09 | ld m[i] | 1 | 0 | LD | 1 | PM | ix | | | ↓ | SubBytes:m =SB(m) |
| S10 | sbox | 0 | 0 | SBOX | 1 | Arbitrary | Arbitrary | | | ↓ | |
| S11 | st m[i] | 0 | 1 | Arbitrary | 0 | PM | ix | ix+1 | | if(ix !=15)S09 | |
| | | | | | | | | 0 | | | |
| S12 | ld m[sr(i)] | 1 | 0 | LD | 1 | PM | sr(ix) | | | ↓ | ShiftRows:w =SR(m) |
| S13 | st m[i] | 0 | 1 | Arbitrary | 0 | PW | ix | ix+1 | | if(ix !=15)S12 | |
| | | | | | | | | 0 | | | |
| S14 | (Loop control) | 0 | 0 | Arbitrary | 0 | Arbitrary | Arbitrary | | round+1 | if(round=9) S29 | |
| | | | | | | | | 0 | | | |
| S15 | ld w[i] | 1 | 0 | LD | 1 | PW | ix | | | ↓ | MixColumns:m =MC(w) |
| S16 | xor w[ofs1(i)] | 1 | 0 | XOR | 1 | PW | ofs1(ix) | | | ↓ | |
| S17 | xtime | 0 | 0 | XTIME | 1 | Arbitrary | Arbitrary | | | ↓ | |
| S18 | xor w[ofs1(i)] | 1 | 0 | XOR | 1 | PW | ofs1(ix) | | | ↓ | |
| S19 | xor w[ofs2(i)] | 1 | 0 | XOR | 1 | PW | ofs2(ix) | | | ↓ | |
| S20 | xor w[ofs3(i)] | 1 | 0 | XOR | 1 | PW | ofs3(ix) | | | ↓ | |
| S21 | st m[i] | 0 | 1 | Arbitrary | 0 | PW | ix | ix+1 | | if(ix !=15)S15 | |
| S22 | ld m[i] | 1 | 0 | LD | 1 | PM | ix | | | ↓ | AddRoundKey:m =AK(m,k) |
| S23 | xor k[i] | 1 | 0 | XOR | 1 | PK | ix | | | ↓ | |
| S24 | st m[i] | 0 | 1 | Arbitrary | 0 | PM | ix | ix+1 | | if(ix !=15)S22 | |
| S25 | ld rc | 1 | 0 | LD | 1 | PX | 0 | | | ↓ | |
| S26 | xtime | 0 | 0 | XTIME | 1 | Arbitrary | Arbitrary | | | ↓ | |
| S27 | st rc | 0 | 1 | Arbitrary | 0 | PX | 0 | | | ↓ | |
| S28 | (Loop control) | | | | | | | | | goto S04 | |
| S29 | ld w[i] | 1 | 0 | LD | 1 | PW | ix | | | ↓ | AddRoundKey:m =AK(w,k) |
| S30 | xor k[i] | 1 | 0 | XOR | 1 | PK | ix | | | ↓ | |
| S31 | st m[i] | 0 | 1 | Arbitrary | 0 | PM | ix | ix+1 | | if(ix !=15)S31 | |

FIG. 31

| Item | Description |
|---|---|
| state | Status number |
| code | Code of function to be executed when existing in this status |
| read | Reading signal to storage device |
| write | Writing signal to storage device |
| func | Function selection of ALU |
| acc_we | Writing signal to accumulator |
| page | Higher 2 bits of address<br>PM: higher 2 bits of beginning address of m<br>PK: higher 2 bits of beginning address of k<br>PW: higher 2 bits of beginning address of w<br>PX: higher 2 bits of beginning address of rc |
| offset | Lower 4 bits of address |
| ix | Operation to index register |
| round | Operation to round counter |
| Control | Shows status of next transition<br>↓ shows status of transition to next status |

F I G. 3 2

| x | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| kp(x) | 13 | 14 | 15 | 12 | 0 | 1 | 2 | 3 | 4 | 5 | 6 | 7 | 8 | 9 | 10 | 11 |
| sr(x) | 0 | 5 | 10 | 15 | 4 | 9 | 14 | 3 | 8 | 13 | 2 | 7 | 12 | 1 | 6 | 11 |
| ofs(x,1) | 1 | 2 | 3 | 0 | 5 | 6 | 7 | 4 | 9 | 10 | 11 | 8 | 13 | 14 | 15 | 12 |
| ofs(x,2) | 2 | 3 | 0 | 1 | 6 | 7 | 4 | 5 | 10 | 11 | 8 | 9 | 14 | 15 | 12 | 13 |
| ofs(x,3) | 3 | 0 | 1 | 2 | 7 | 4 | 5 | 6 | 11 | 8 | 9 | 10 | 15 | 12 | 13 | 14 |

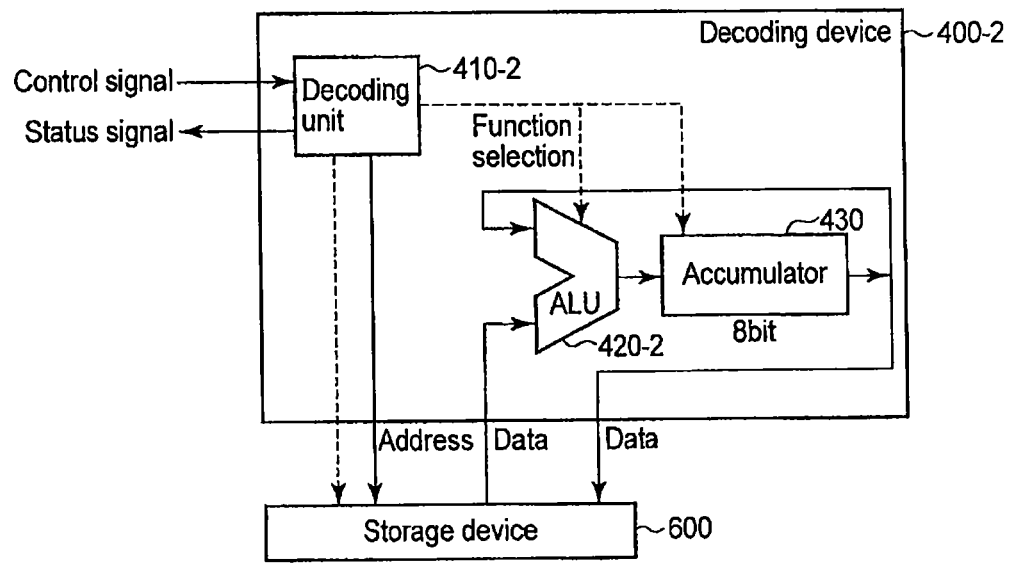
F I G. 3 5
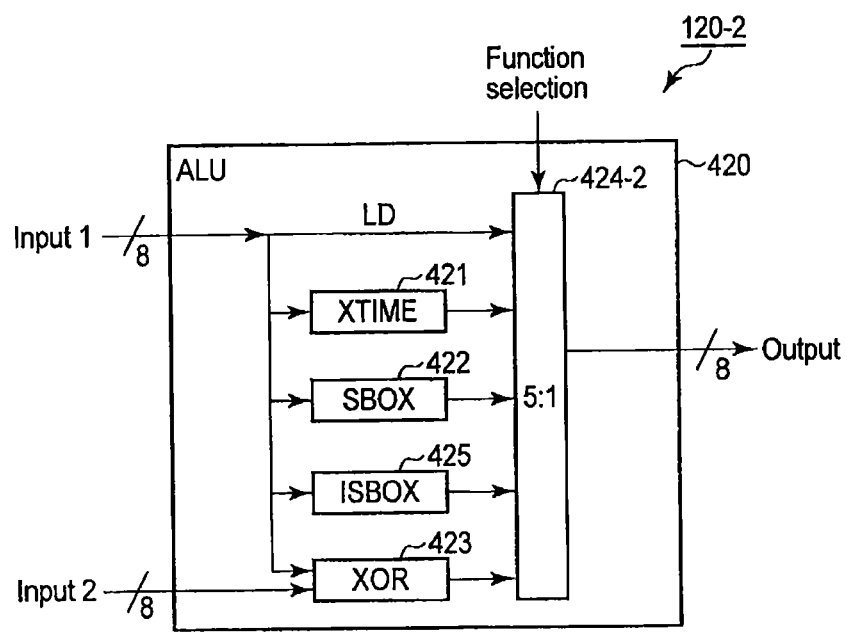
F I G. 3 6

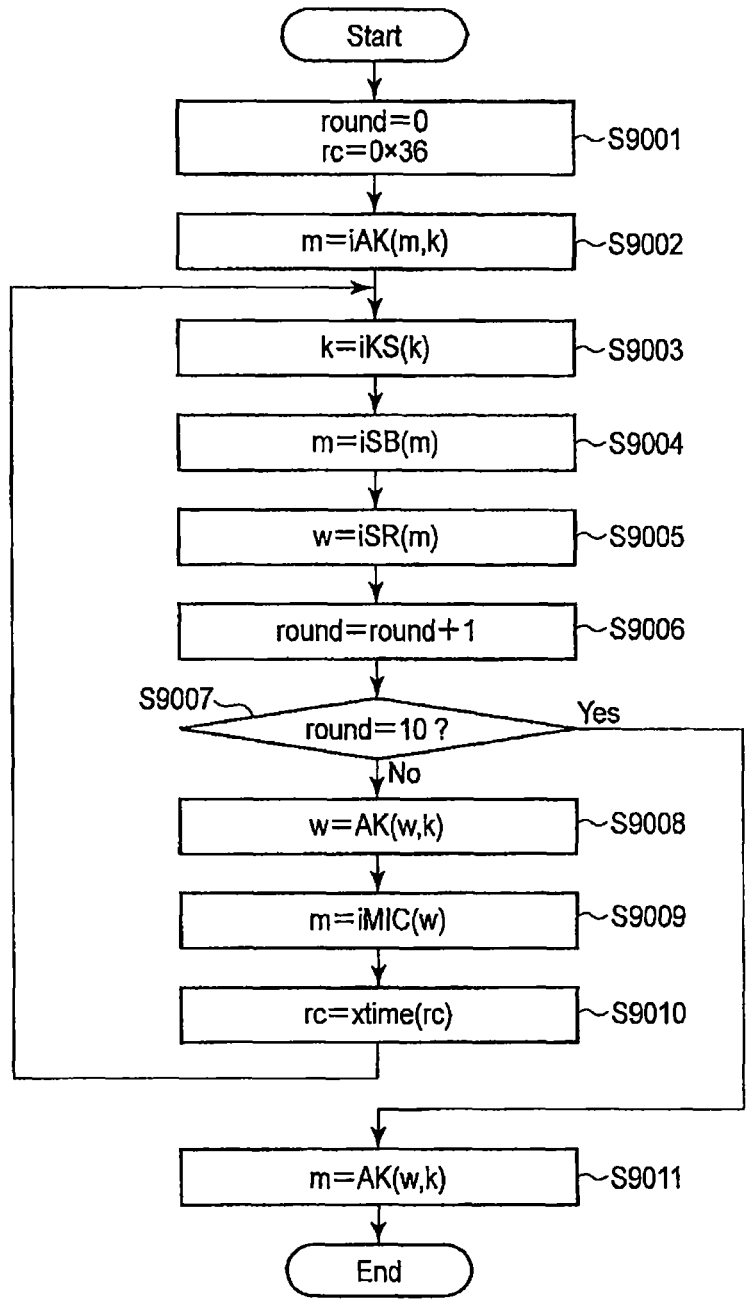
F I G. 3 7

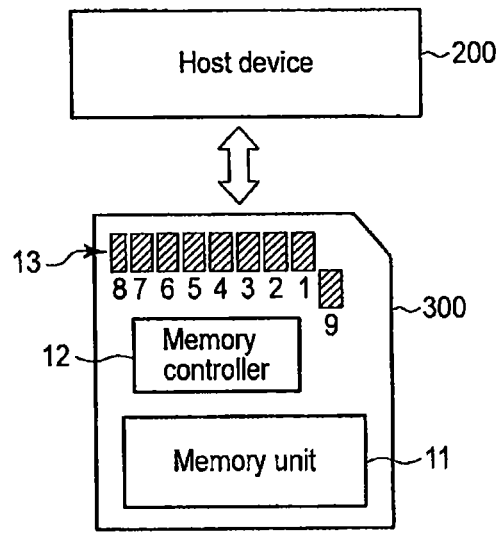

FIG. 38

| Pin No | SD | | SPI |
|---|---|---|---|
| | 1 bit | 4 bits | 1 bit |
| 1 | Card detection (CD) | Card detection (CD) /data (DAT3) | Card selection (CS) |
| 2 | Command (CMD) /response (RES) | Command (CMD) /response (RES) | Host transmission command & data (DI) |
| 3 | Grounding voltage (VSS1) | Grounding voltage (VSS1) | Grounding voltage (VSS1) |
| 4 | Supply voltage (VDD) | Supply voltage (VDD) | Supply voltage (VDD) |
| 5 | Clock signal (CLK) | Clock signal (CLK) | Clock signal (CLK) |
| 6 | Grounding voltage (VSS2) | Grounding voltage (VSS2) | Grounding voltage (VSS2) |
| 7 | Data (DAT0) | Data (DAT0) | Card transmission command & data (DO) |
| 8 | | Data (DAT1) | RSV |
| 9 | | Data (DAT2) | RSV |

FIG. 39

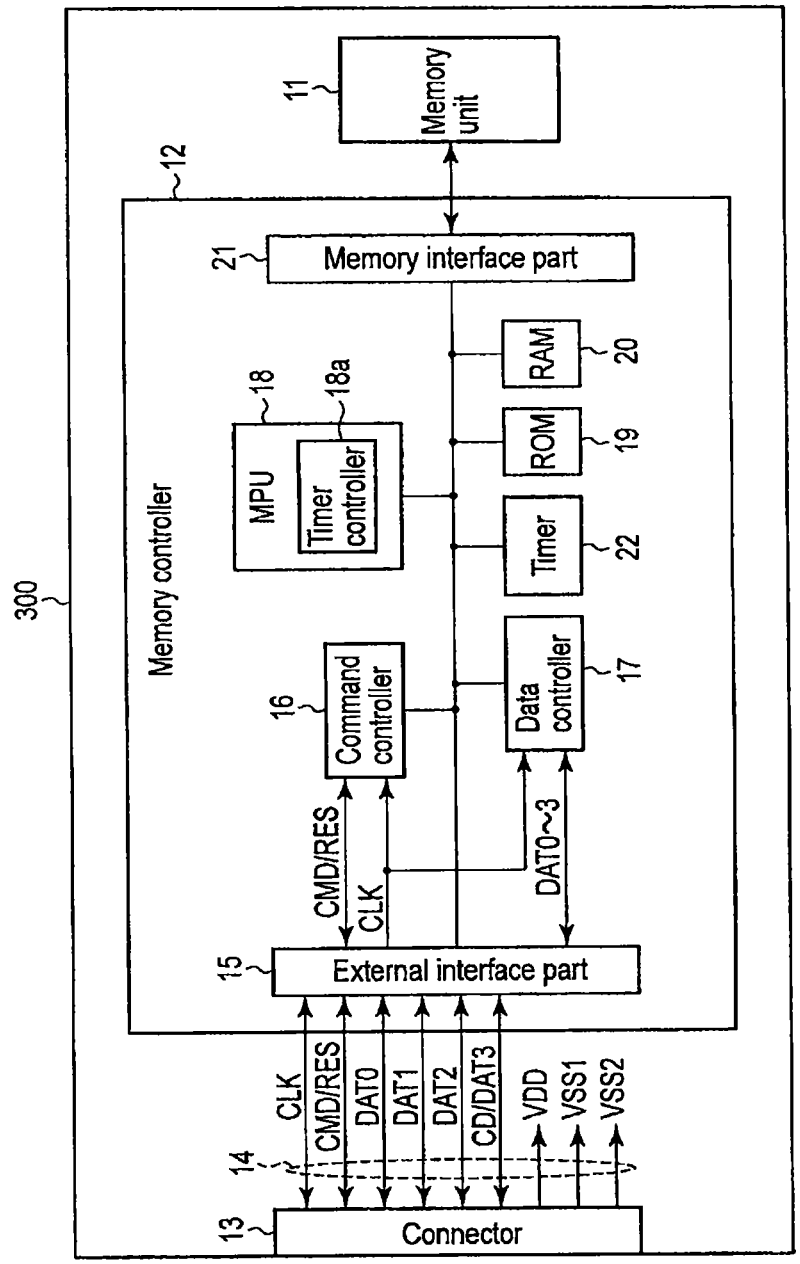
F I G. 40

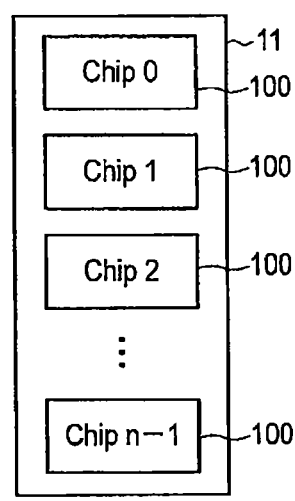
F I G. 4 1

NONVOLATILE SEMICONDUCTOR STORAGE DEVICE HAVING ENCRYPTING ARITHMETIC DEVICE

CROSS-REFERENCE TO RELATED APPLICATIONS

This application is a continuation application of U.S. application Ser. No. 13/603,707, filed Sep. 5, 2012, and is based upon and claims the benefit of priority from Japanese Patent Application No. 2011-265273, filed Dec. 2, 2011, the entire contents of which are incorporated herein by reference.

FIELD

Embodiments described herein relate generally to a nonvolatile semiconductor storage device having an encrypting arithmetic device.

BACKGROUND

AES (Advanced Encryption Standard) is a standard encrypting system in the United States and is employed in various fields. Various studies have been carried out for downsizing of AES circuits (AES arithmetic circuits) (reduction of hardware circuit scale).

BRIEF DESCRIPTION OF THE DRAWINGS

FIG. 4 is a circuit diagram showing a circuit example of one memory block out of a plurality of memory blocks shown in FIG. 3;

FIG. 5 is a block diagram schematically showing a basic configuration of a page buffer and its peripheral circuits in the first embodiment;

FIG. 6 is a circuit diagram schematically showing a basic configuration of the page buffer and its peripheral circuits in the first embodiment;

FIG. 10 is a block diagram schematically showing a basic configuration and a flow of signals of an AES encrypting arithmetic device in the first embodiment;

FIG. 11 is a block diagram showing an AES encrypting sequence in the first embodiment;

FIG. 19 is a block diagram of the encrypting device in the third embodiment;

FIG. 20 is a diagram for explaining meaning of commands of dummy codes;

FIG. 23 is a diagram showing a processing example of st command;

FIG. 24 is a diagram showing a processing example of xor command;

FIG. 25 is a diagram showing a processing example of sbox and xtime commands;

FIG. 26 is a block diagram of an encrypting unit in the third embodiment;

FIG. 27 is a diagram showing an address space used in the third embodiment;

FIG. 30 is a flowchart of encrypting process in the third embodiment;

FIG. 31 is a diagram of a specific edition dummy code rewritten as a status transition table;

FIG. 32 is a diagram showing the reading method of each item in the status transition table;

FIG. 35 is a block diagram of a decoding device in a fourth embodiment;

FIG. 36 is a block diagram of an ALU in the fourth embodiment;

FIG. 37 is a flowchart of decoding process in the fourth embodiment;

FIG. 38 is a block diagram of a memory system in a fifth embodiment;

FIG. 39 is a diagram showing a plurality of pins and individually assigned in the fifth embodiment;

FIG. 40 is a block diagram of a memory card in the fifth embodiment; and

FIG. 41 is a block diagram of a memory unit in the fifth embodiment.

DETAILED DESCRIPTION

Figure 1:
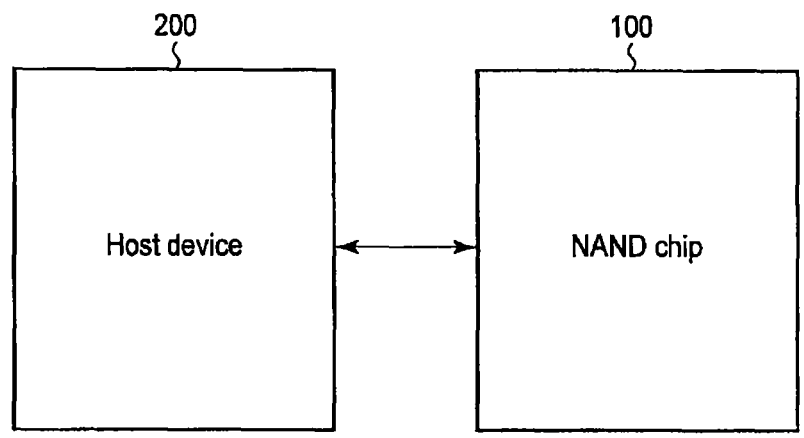
FIG. 1 is a block diagram schematically showing a basic configuration of a system relating to a first embodiment.

In general, according to one embodiment, a nonvolatile semiconductor storage device includes an encrypting circuit for operating in a predetermined encrypting system, a memory cell array preliminarily storing complementary data to be used in the operation, and a page buffer having a first region for storing the data being read out from the memory cell array, and a second region used when executing the operation.

The nonvolatile semiconductor storage device further includes:

a register for storing the data from the first region, and supplying the stored data into the second region, and an inspection circuit for judging presence or absence of an error in the data when storing the data in the register, and storing the data in the register when the data is judged to be free from error.

Further, the nonvolatile semiconductor storage device includes:

a control circuit for controlling reading of the data from the memory cell array into the first region, and controlling reading of the data from the first region into the second region, and an address control circuit for designating an address of the page buffer or the memory cell array, based on a signal supplied from the control circuit.

The control circuit controls the address control circuit, and supplies the data from the first region into the second region, when the inspection circuit judges that the data contains an error, the inspection circuit notifies the address control circuit of the judgment, the address control circuit, when receiving the notice, designates other address storing data of same contents as the data from the page buffer, and the inspection circuit judges presence or absence of data error in the other address.

Recently, the NAND flash memory (or simply the NAND) is much more increased in the capacity, and data of large capacity is often stored in the NAND flash memory, such as music, movie and game software. In most cases, such data is authorized by the copyright law.

To protect the right of these contents, there has been considered a certain function that "authentication" a card on which the NAND flash memory is mounted, by a host device such as a movie reproducing machine. There has been proposed authentication system, for example, the host device which identifies whether the media is a proper card or an illegally copied card, and refuses reproduction of the movie in the latter case.

In such authentication system, at the present, an encrypting system known as AES (Advanced Encryption Standard) is being considered. AES is a standard encrypting system in the United States, and is employed in various fields.

Presently, various studies have been carried out for downsizing of the AES circuit (AES operation circuit) (reduction of circuit scale of the hardware).

For example, the AES system can be reduced in size by providing a storage device (RAM) for operating arithmetic data for encrypting according to AES outside of the encrypting device.

In the past studies for downsizing of AES operation circuit, it was mainly intended to reduce the size of the entire AES operation circuit including the storage device used in AES operation (for example, RAM). Since the AES operation circuit is employed in a state being assembled in a certain device (electronic device), and the size of the AES operation circuit needs to be reduced in consideration of such a circumstance of use. However, there has been no study about downsizing in consideration that the AES operation circuit is assembled in other device (system) and is used in such state.

Generally, the system includes a storage device intended to be used in other applications, such as a page buffer (random access memory) of a nonvolatile NAND flash memory. Accordingly, in the encrypting device of the first preferred embodiment, such memory device is used commonly when the AES operation circuit is used. Hence, the storage device is not needed in the AES operation circuit, and the size can be further reduced.

The embodiment having such configuration is described below while referring to the drawings. In the following explanation, constituent elements having similar functions and structures are identified with same reference numerals, and repeated descriptions are given only where necessary. An alphabetical letter following a numeral expressing a reference number is referred to by a reference numeral including a same number, and is intended to distinguish individual elements having similar configurations.

The following embodiments show examples of the device and the method of realizing the technical concept of the embodiments, and the technical concept of the embodiments are not intended to specify the material, shape, structure or configuration of the component parts, and the technical concept of the embodiments may be changed variously within the scope of the claims thereof.

In each embodiment, examples of the storage device and the arithmetic device to be applied in the encrypting device of AES encrypting system are explained. In addition, it should be noted that each embodiment may also be employed in other device than the AES system encrypting device.

(First Embodiment)

To realize a function of AES, aside from AES encrypting circuit, AES key storage device and a RAM are needed. In this embodiment, a NAND flash memory is used as the AES key storage device, and a page buffer is used as the RAM. The AES encrypting arithmetic device main body including the AES encrypting circuit is disposed in a peripheral circuit area, excluding the core circuit, out of the NAND chip. Details thereof will be described as follows.

Referring first to FIG. 1, a basic configuration of the system of the first embodiment is described. FIG. 1 is a block diagram schematically showing a basic configuration of the system relating to the first embodiment.

This system includes a NAND chip 100 (also called NAND flash memory or simply NAND, etc.) on which an AES operation circuit (also called AES encrypting device), and a host device 200 for controlling them from outside.

Figure 2:
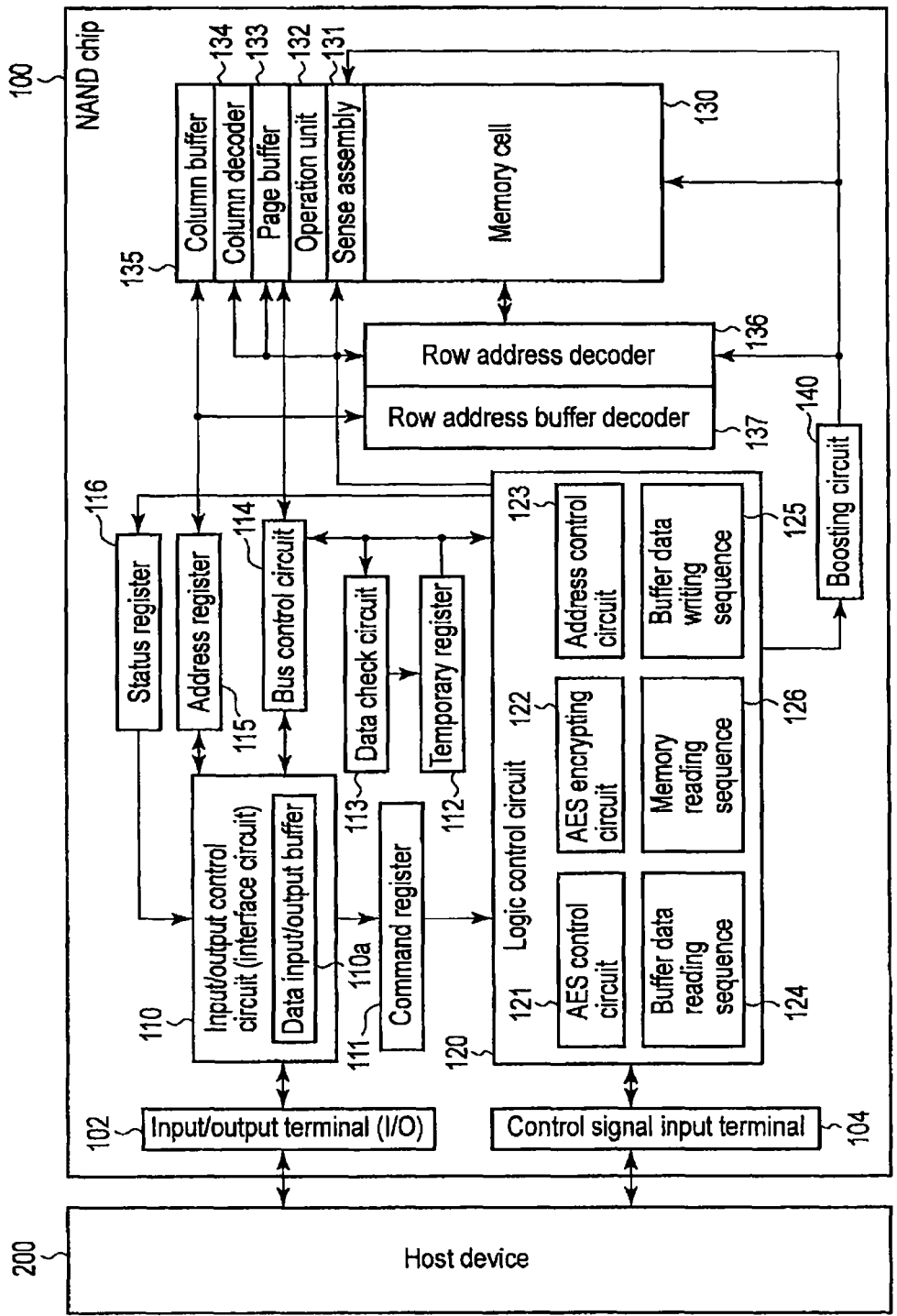
FIG. 2 is a block diagram schematically showing a basic configuration of a NAND chip used in the first embodiment.

Referring next to FIG. 2, a basic configuration of the NAND chip of the first embodiment is described. FIG. 2 is a block diagram schematically showing a basic configuration of the NAND chip relating to the first embodiment.

As shown in FIG. 2, the NAND chip 100 in the first embodiment includes an input/output terminal (I/O) 102, a control signal input terminal 104, an input/output control circuit 110, a command register 111, a temporary register 112, a data check circuit 113, a bus control circuit 114, an address register 115, a status register 116, a logic control circuit 120, a memory cell array 130, a sense amplifier 131, an arithmetic unit 132, a page buffer 133, a column decoder 134, a column buffer 135, a row address decoder 136, a row address buffer decoder 137, and a boosting circuit 140.

The input/output terminal 102 and the control signal input terminal 104 are external interfaces for connecting between the host device 200 and the NAND chip 100. The input/output terminal 102 has, for example, a data input/output terminal, a command input terminal, an address input terminal, and others, all of which is not shown. The control signal input terminal 104 has, for example, a WE terminal for supplying a data input clock, an RE terminal for supplying a data output clock, a DQS terminal for transmitting data input and output clocks, a CLE terminal for enabling receiving a data input as a command, an ALE terminal for enabling receiving a data input as an address, a CE terminal for validating the general functions of data input and output, etc., a WP terminal for transmitting a write preventive signal for preventing wrong writing, and others, all of which is not shown. The control signal input terminal 104 also has terminals utilized when realizing data transmission by high-speed interface, such as /RE terminal, /WE terminal, and /DQS terminal for transmitting complementary signals of RE terminal, WE terminal, and DQS terminal. Although not shown in FIG. 2, there are also other terminals, such as R/B terminal for showing an internal operation state of the NAND chip 100, and Vcc/Vss/Vccq/Vssq terminals for power supply.

The input/output control circuit 110 is connected to the input/output terminal 102, and the registers for holding various parameters. The input/output control circuit 110 also includes a data input/output buffer 110a. The data input/output buffer 110a receives data from the data input/output terminal, and stores the data in the data storage circuit selected by the column decoder 134. The data input/output buffer 110a sends out data by way of the data input/output terminal to outside. From the data input/output terminal, aside from write data, various commands and addresses for writing, reading, erasing, status reading and others are entered.

The command register 111 sends out commands entered from the input/output control circuit 110 to the logic control circuit 120.

The data check circuit 113 inspects if the data contains an error or not, when transferring data in the storage area such as the key used in AES to a working region (not shown) of the page buffer 133.

The temporary register 112 is a register for temporarily holding, for example, the data of which no error is detected in an inspection by the data check circuit 113.

The bus control circuit 114 is a circuit for changing over connection, for example, between the input/output control circuit 110 and the page buffer 133, and between the logic control circuit 120 and the page buffer 133.

The address register 115 latches, for example, the address supplied from the host device 200, converts the latched address into an internal physical address, and supplies a column address to the column buffer 135, and a row address to the row address buffer decoder 137.

The status register 116 is for notifying outside various statuses in the NAND chip 100, and includes a ready/busy register for holding the data showing whether the NAND chip 100 is in ready state or busy state, and a write status register (not shown) for holding data showing write pass/fail.

Further, it may also include, for example, a wrong writing status register for holding data showing presence or absence of wrong writing state (pass/fail of wrong writing verify), or an over-writing status register for holding data showing presence or absence of over-writing state (pass/fail of over-writing verify), and the like.

The logic control circuit 120 controls the memory cell array 130, the column decoder 134, the data input/output buffer 110a, and the row address decoder 136.

The logic control circuit 120 includes an AES control circuit 121, an AES encrypting circuit 122, an address control circuit 123, a buffer data reading sequence 124, and a buffer data writing sequence 125. In this embodiment, the AES control circuit 121, the AES encrypting circuit 122, the address control circuit 123, the buffer data reading sequence 124, and the buffer data writing sequence 125 may be collectively called the AES encrypting arithmetic device.

The AES control circuit 121 controls the AES encrypting circuit 122.

The AES encrypting circuit 122 is an arithmetic unit for executing an operation of AES encrypting system.

The address control circuit 123 generates an address of the page buffer 133 or the temporary register 112 for storing the data to be used in the AES encryption arithmetic process.

The buffer data reading sequence 124 is a sub-sequence control circuit for controlling transfer of data from the page buffer 133 to the AES encrypting circuit 122 or the temporary register 112.

The buffer data writing sequence 125 is a sequence circuit for transferring the data from the AES encrypting circuit 122 or the temporary register to the page buffer.

The memory reading sequence 126 senses the data by using the sense amplifier 131, from the page in the memory cell array 130, and stores the reading data in the page buffer 133.

The logic control circuit 120 controls and operates according to control signals (command latch enable signal CLE, address latch enable signal ALE, ready/busy RY/BY signal, etc.) entered from outside by way of the control signal input terminal 104, and commands entered from the data input/output terminal by way of the data input/output buffer 110a. In other words, the logic control circuit 120, depending on the control signals and commands, generates desired voltages at the time of data programming, verifying, reading, or erasing, and supplies to necessary parts in the memory cell array 130.

The memory cell array 130 includes a plurality of bit lines BL, a plurality of word lines WL, and a source line SL. The memory cell array 130 is constituted of a plurality of blocks BLK in which electrically programmable memory cell registers (or simply called memory cells) MC are disposed in a matrix pattern. The memory cell MC has a lamination gate including a control gate electrode and a charge accumulation layer (for example, a floating gate electrode), and stores binary or multilevel data depending on changes of threshold value of transistor determined by the charge amount accumulated in the floating gate electrode. The memory cell MC may also have a MONOS (metal-oxide-nitride-oxide-silicon) structure for trapping electrons on a charge trap type insulation film (for example, a nitride film).

The sense amplifier 131 senses and amplifies the voltage of the bit line BL (column) in the memory cell array 130, and executes the process of data storing, data reading, and data erasing in the memory cell array.

The operation unit 132 can calculate such as Boolean algebra between arbitrary data, and store the result in the data latch. This operator is used in ordinary operations such as NAND writing and reading.

The page buffer 133 is a data temporary storing region for latching the data for writing.

The column decoder 134 selects a data storage circuit (a buffer circuit) in the page buffer 133, and sends out he data in the memory cell MC being read out into this storage circuit, to outside (the controller 100) from the data input/output terminal by way of the data input/output buffer 110a. Further, the column decoder 134 detects the status of the memory cell MC by way of the bit line BL, and applies a writing control voltage to the memory cell MC by way of the bit line BL, and writes into the memory cell MC.

The column buffer 135 stores the column address entered from the address register 115.

The row address decoder 136 selects any block BLK at the time of operation of data reading, writing, or erasing, and does not select the remaining blocks BLK. In other words, the row address decoder 136 applies necessary voltages to the word line WL and the selected gate lines VSGS, VSGD in the memory cell array 130, at the time of operation of reading, writing, or erasing.

The row address buffer decoder 137 stores the row address entered from the address register 115.

The boosting circuit 140 boosts the supply voltage. The supply voltage is boosted as required, and is supplied into the memory cell array 130, the sense amplifier 131, and the row address decoder 136.

Figure 3:
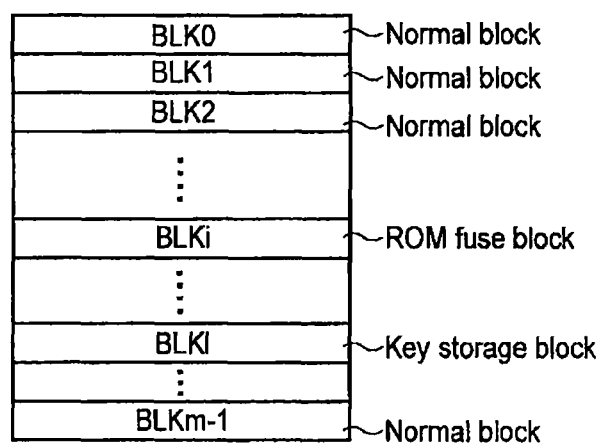
FIG. 3 is a block diagram schematically showing a basic configuration of a memory cell array in the first embodiment.

Referring now to FIG. 3 and FIG. 4, a basic configuration of the memory cell array 130 in the embodiment is schematically described below.

FIG. 3 is a block diagram schematically showing a basic configuration of the memory cell array 130 in the embodiment.

The memory cell array 130 is constituted of a plurality of memory blocks BLK0 to BLKm−1 (m being 1 or larger integer). The plurality of memory blocks BLK0 to BLKm−1 are arranged in a bit line BL direction (column direction).

These blocks may be used in various applications, for example, ROM fuse block BLKi used as ROM fuse region, or key storage block BLK1 including a page in which key data is stored.

The ROM fuse block BLKi stores various initial setting values necessary for initialization of the NAND chip 100 or the like.

The key storage block BLK1 is a region for prohibiting not only data recording but also data reading, to outside of the NAND chip 100. The key storage block BLK1 preliminarily stores confidential information, such as key data used in the AES encrypting operation.

Here is a description of handling for mounting of the key storage block BLK1 in which data reading is prohibited. The information stored in this key storage block BLK1 is confidential information, and contains data to be protected, and hence data cannot be directly sent out to outside of the NAND chip 100 (for example, the host device 200). However, in the process of manufacturing the NAND chip 100, it may be desired to check if the key data is written correctly or not, for the purpose of testing the key storage block BLK1 or the like. In such a case, specific data is applied to the NAND chip 100 from outside of the NAND chip 100, an arithmetic operation is carried out between the given data and the key according to a specific rule, and the result is obtained, and hence it is judged whether or not the data is correctly written into the key storage block BLK1. The specific data may be the key data itself, and in such a case, the key data stored in the key storage block BLK1 and the key data entered from outside of the NAND chip 100 are calculated and an exclusive OR is obtained, and this result is sent to outside of the NAND chip 100.

Alternatively, a random number generating circuit is further provided in the NAND chip 100, and the key data and a random number generated in the random number generating circuit are calculated, and the result is sent to outside of the NAND chip 100.

Herein, in the case of the NAND chip 100 provided with the random number generating circuit, if it is possible to generate a random number by using a part of the existing circuit in the NAND chip 100, it is effective to suppress increase in the circuit area.

FIG. 4 is a circuit diagram showing an example of a circuit of one memory block, out of the plurality of memory blocks shown in FIG. 3.

As shown in FIG. 4, one memory block includes a plurality of NAND cells (also called cell units, or NAND strings, for example) aligned in a word line WL direction (row direction).

One NAND cell includes a series-connected plurality of memory cell transistors (simply called memory cells) MT, a selection gate transistor ST1 connected to a drain of memory cell transistor MT at one end, and a selection gate transistor ST2 connected to a source of memory cell at other end.

The memory cell transistor MT includes a charge accumulation layer formed on a semiconductor substrate by way of a gate insulation film, a gate insulation film formed on the charge accumulation layer, and a control gate electrode formed on the gate insulation film. The number of memory cell transistors MT is not limited to 8 pieces, but 16, 32, 64, 128, or 256 pieces may be used, and the number is not limited. Between the selection gate transistors ST1 and ST2, a current passage is disposed such that the passage is connected in series. The drain region at one end of the series-connected memory cell transistor MT is connected to the source region of the selection gate transistor ST1, and the source region at other end is connected to the drain region of the selection gate transistor ST2.

The bit lines BL0 to BLq−1 (q being 1 or larger integer) are connected to the drain of the selection gate transistor ST1. The source line SL is connected to the source of the selection gate transistor ST2. The bit lines BL0 to BLq−1, if not distinguished individually, are collectively called bit lines BL. Both of the selection gate transistors ST1 and ST2 are not always required, and only either of them may be provided if the NAND cell can be selected.

The word lines WL0 to WLn−1 (n being 1 or larger integer) are extended in a WL direction, and are connected commonly by the memory cells adjacent in the WL direction. For the sake of simplicity of explanation, the word lines WL0 to WL7 may be collectively called word lines WL if not distinguished individually.

Select gate lines SGD, SGS are commonly connected at gate electrodes of the selection transistors ST1, ST2 of the memory cells respectively.

In the plurality of memory cell transistors MT connected to one word line WL, data is written in a lump, and this unit is called a page. Further, in the plurality of NAND cells on a same row, data is erased in a lump, and this unit is called a memory block.

Referring to FIG. 5 to FIG. 8, a basic configuration of the page buffer (data latch) 133 in the first embodiment is schematically described below. FIG. 5 is a block diagram schematically showing a basic configuration of the page buffer 133 and its peripheral circuits in the first embodiment.

As shown in FIG. 5, the sense amplifier 131 includes a plurality of sensing parts SA_0, SA_1, SA_2, SA_3, . . . , SA_q−1 connected to the bit lines BL. Hereinafter, the plurality of sensing parts may be merely denoted as sensing parts SA unless necessary to distinguish them individually.

The operation unit 132 includes a plurality of operators YB_0, YB_1, YB_2, YB_3, . . . , TB_q−1 connected respectively to the sensing parts SA. Hereinafter, the plurality of operators may be merely denoted as operators YB unless necessary to distinguish them individually.

In the page buffer 133, a plurality of buffer circuits AD_0, BD_0, CD_0, and XD_0 are connected to one sensing part SA. In the page buffer 133, four buffer circuits are connected in every sensing part SA. Unless necessary to distinguish them individually, the plurality of buffer circuits may be merely denoted as buffer circuits AD, BD, CD, or XD.

The column decoder 134 includes a plurality of switches SW_0, SW_1, SW_2, SW_3, . . . , SW_q−1 connected individually to the buffer circuits XD. Unless necessary to distinguish them individually, the plurality of switches may be merely denoted as switches SW.

The address control circuit 123 supplies address selection signals to the individual switches SW, and thereby controls the column decoder 134.

The AES encrypting circuit 122 transmits and receives data with the page buffer 133 by way of the column decoder 134. The AES encrypting circuit 122 also controls the address control circuit 123.

The AES control circuit 121 controls the AES encrypting circuit 122.

FIG. 6 is a circuit diagram schematically showing a circuit example of the page buffer 133 and its periphery.

In one sensing part SA, a plurality of buffer circuits (latch circuits) AD, BD, CD, XD are connected by way of the operators (YBOX) YB. At least one of these page buffers (buffer circuit XD in this example) is directly connected to data line IO_BUS_X (data line connecting between the page buffer 133 and the bus control circuit 114 in FIG. 2) connecting between the data input/output terminal (not shown) in the input/output terminal 102 and the data input/output buffer. Each buffer circuit can hold data.

For example, various sequences can load data to be written into the memory cell array 130 from the host device 200 by way of this buffer circuit XD, and send out the data being read out from the memory cell array 130 to the host device 200.

Figure 7:
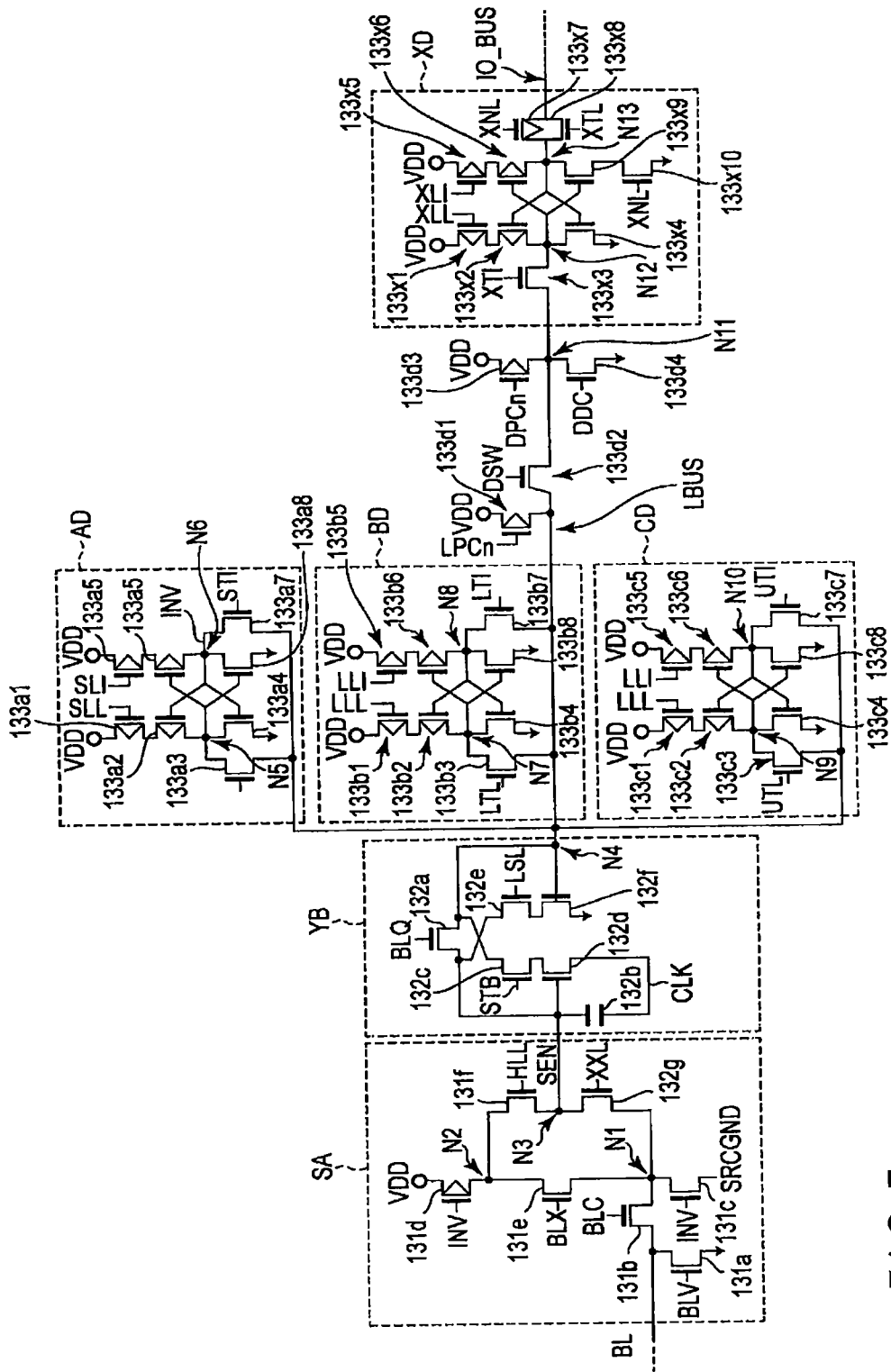
FIG. 7 is a circuit diagram more specifically showing the page buffer and its peripheral circuits in the first embodiment.

FIG. 7 is a circuit diagram more specifically showing the circuit example of the page buffer 133 and its periphery.

The sensing part SA includes an n-type transistor 131a having one end of a current passage connected to the bit line BL, receiving BLV at the gate, and having the other end connected to the ground, an n-type transistor 131b having one end of the current passage connected to the bit line BL, receiving BLC at the gate, and having the other end connected to the node N1, and a transistor 131c having one end of the current passage connected to the node N1, receiving INV at the gate, and having the other end connected to the SRCGND potential. Further, the sensing part SA includes a p-type transistor 131d having one end of the current passage connected to the power supply VDD, receiving INV at the gate, and having the other end connected to the node N2, an n-type transistor 131e having one end of the current passage connected to the node N2, receiving BLX at the gate, and having the other end connected to the node N1, an n-type transistor 131f having one end of the current passage connected to the node N2, receiving HLL at the gate, and having the other end connected to the node N3 (=SEN), and an n-type transistor 131g having one end of the current passage connected to the node N3, receiving XXL at the gate, and having the other end connected to the node N1.

The operator YB includes an n-type transistor 132a having one end of a current passage connected to the node N3, receiving BLQ at the gate, and having the other end connected to the node N4, and a capacitor 132b having one end connected to the node N3, and receiving CLK at the other end. Further, the operator YB includes an n-type transistor 132c having end of the current passage connected to the node N4, and receiving STB at the gate, and an n-type transistor 132d having one end of the current passage connected to the other end of the current passage of the transistor 132c, having the node SEN connected to the gate, and receiving CLK at the other end. Moreover, the operator YB includes a transistor 132e having one end of the current passage connected to the node N3, and receiving LSL at the gate, and a transistor 132f having one end of the current passage connected to the other end of the current passage of the transistor 132e, having the node N4 (=data line LBUS) connected to the gate, and having the other end connected to the ground.

The buffer circuit AD includes a p-type transistor 133a1 receiving power supply VDD at one end of a current passage, and receiving SLL at the gate, a p-type transistor 133a2 having one end of the current passage connected to the other end of the current passage of the transistor 133a1, having the node N6 (=INV) connected to the gate, and having the other end connected to the node N5, an n-type transistor 133a3 having one end of the current passage connected to the node N5, receiving STL at the gate, and having the other end connected to the node N4, and an n-type transistor 133a4 having one end of the current passage connected to the node N5, having the gate connected to the node N6, and having the other end connected to the ground. The buffer circuit AD further includes a p-type transistor 133a5 receiving power supply VDD at one end of the current passage, and receiving SLI at the gate, a p-type transistor 133a6 having one end of the current passage connected to the other end of the current passage of the transistor 133a5, having the gate connected to the node N5, and having the other end connected to the node N6, a n-type transistor 133a7 having one end of the current passage connected to the node N6, receiving STI at the gate, and having the other end connected to the node N4, and an n-type transistor 133a8 having one end of the current passage connected to the node N6, having the gate connected to the node N5, and having the other end connected to the ground.

The buffer circuit BD includes a p-type transistor 133b1 receiving power supply VDD at one end of a current passage, and receiving LLL at the gate, a p-type transistor 133b2 having one end of the current passage connected to the other end of the current passage of the transistor 133b1, having the node N8 connected to the gate, and having the other end connected to the node N7, an n-type transistor 133b3 having one end of the current passage connected to the node N7, receiving LTL at the gate, and having the other end connected to the node N4, and an n-type transistor 133b4 having one end of the current passage connected to the node N7, having the gate connected to the node N8, and having the other end connected to the ground. The buffer circuit BD further includes a p-type transistor 133b5 receiving power supply VDD at one end of the current passage, and receiving LLI at the gate, a p-type transistor 133b6 having one end of the current passage connected to the other end of the current passage of the transistor 133b5, having the gate connected to the node N7, and having the other end connected to the node N8, an n-type transistor 133b7 having one end of the current passage connected to the node N8, receiving LTI at the gate, and having the other end connected to the node N4, and an n-type transistor 133b8 having one end of the current passage connected to the node N8, having the gate connected to the node N7, and having other end connected to the ground.

The buffer circuit CD includes a p-type transistor 133c1 receiving power supply VDD at one end of a current passage, and receiving ULL at the gate, a p-type transistor 133c2 having one end of the current passage connected to the other end of the current passage of the transistor 133c1, having the gate connected to the node N10, and having the other end connected to the node N9, an n-type transistor 133c3 having one end of the current passage connected to the node N9, receiving UTL at the gate, and having other end connected to the node N4, and an n-type transistor 133c4 having one end of the current passage connected to the node N9, having the gate connected to the node N10, and having the other end connected to the ground. The buffer circuit CD further includes a p-type transistor 133c5 receiving power supply VDD at one end of the current passage, and receiving ULI at the gate, a p-type transistor 133c6 having one end of the current passage connected to the other end of the current passage of the transistor 133c5, having the gate connected to the node N9, and having the other end connected to the node N10, an n-type transistor 133c7 having one end of the current passage connected to the node N10, receiving UTI at the gate, and having other end connected to the node N4, and an n-type transistor 133c8 having one end of the current passage connected to the node N10, having the gate connected to the node N9, and having the other end connected to the ground.

Further, between the buffer circuits BD and XD, there are other transistors, that is, a p-type transistor 133d1 receiving power supply VDD at one end of a current passage, receiving LPCn at the gate, and having the other end connected to the node N4, an n-type transistor 133d2 having one end of the current passage connected to the node N4, receiving DSW at the gate, and having the other end connected to the node N11, a p-type transistor 133d3 receiving power supply VDD at one end of the current passage, receiving DPCn at the gate, and having the other end connected to the node N11, and an n-type transistor 133d4 having one end of the current passage connected to the node N11, receiving DDC at the gate, and having other end connected to the ground. Herein, LPCn precharges the LBUS in the case of L. DSW is a signal for connecting between the LBUS and the buffer circuit XD. DPCn and DDC are signals for precharging or discharging the buffer circuit XD.

The buffer circuit XD includes a p-type transistor 133x1 receiving power supply VDD at one end of a current passage, and receiving XLL at the gate, a p-type transistor 133x2 having one end of the current passage connected to the other end of the current passage of the transistor 133x1, having the gate connected to the node N13, and having the other end connected to the node N13, an n-type transistor 133x3 having one end of the current passage connected to the node N12, receiving XTI at the gate, and having the other end connected to the node N11, and an n-type transistor 133x4 having one end of the current passage connected to the node N12, having the gate connected to the node N13, and having the other end connected to the ground. The buffer circuit XD further includes a p-type transistor 133x5 receiving power supply VDD at one end of the current passage, and receiving XLI at the gate, and a p-type transistor 133x6 having one end of the current passage connected to the other end of the current passage of the transistor 133x5, having the gate connected to the node N12, and having other end connected to the node N13. The buffer circuit XD further includes a p-type transistor 133x7 having one end of the current passage connected to the node N13, receiving XNL at the gate, and having the other end connected to data line IO_BUS_X, an n-type transistor 133x8 having one end of the current passage connected to the node N13, receiving XTL at the gate, and having other end connected to data line IO_BUS_X, an n-type transistor 133x9 having one end of the current passage connected to the node N13 and having the gate connected to the node N12, and an n-type transistor 133x10 having one end of the current passage connected to the other end of the current passage of the transistor 133x9, receiving XNL at the gate, and having the other end connected to the ground.

Figure 8:
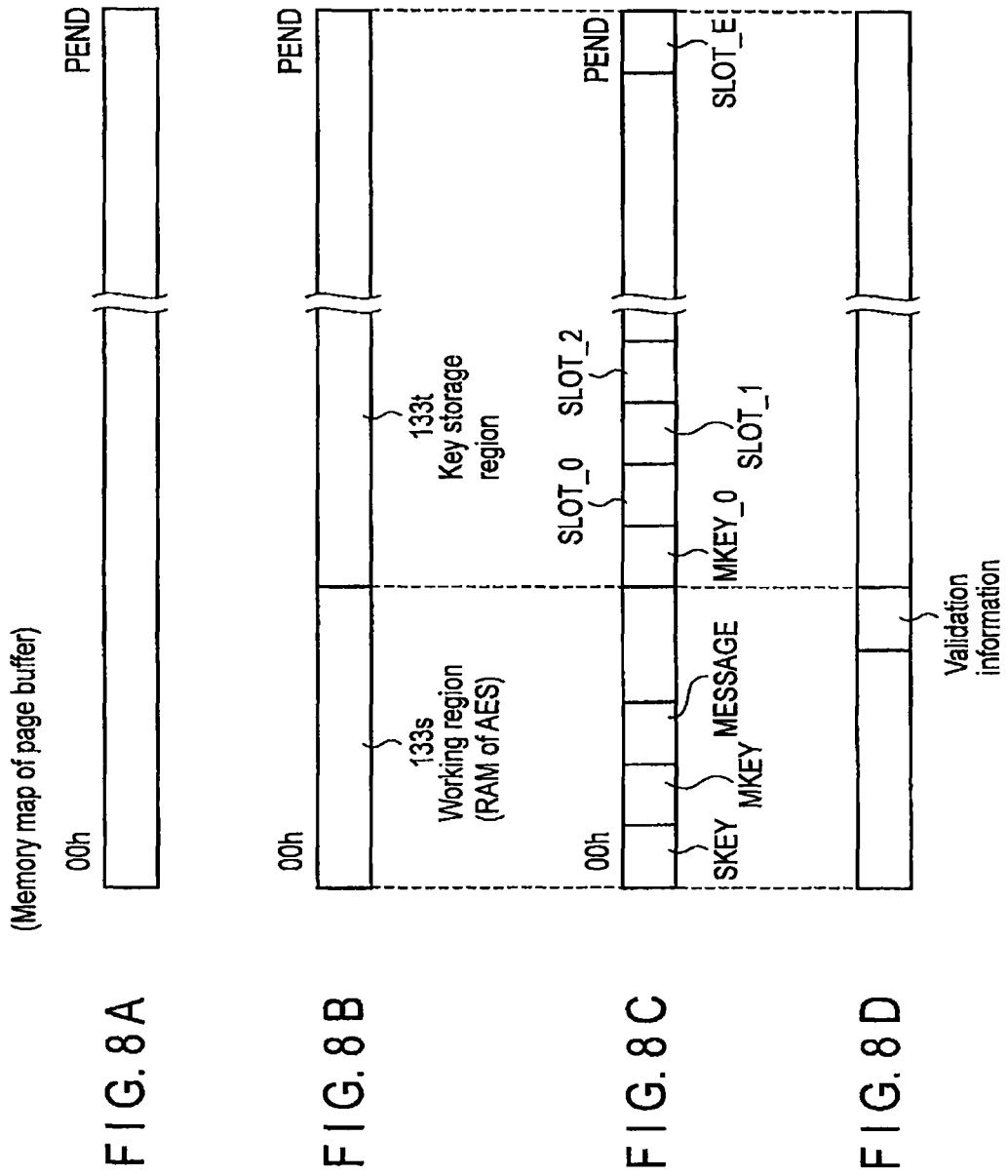
FIG. 8A is a schematic diagram showing a basic configuration of the page buffer in the first embodiment.
FIG. 8B is a schematic diagram relating to functionally divided regions in the page buffer in the first embodiment.
FIG. 8C is a schematic diagram more specifically showing the allocation in the pager buffer in the first embodiment.
FIG. 8D is a schematic diagram showing the allocation in the pager buffer in the first embodiment.

Referring next to FIG. 8, the address space in the storage region in the page buffer 133 used in the AES encrypting circuit 122 in the embodiment is schematically described below. FIG. 8A is a schematic diagram showing a basic configuration of the page buffer 133 in the embodiment, FIG. 8B is a schematic diagram relating to functionally divided regions of the page buffer 133 in the embodiment, and FIG. 8C is a schematic diagram more specifically showing the allocation of the page buffer 133 in the embodiment.

In the key storage block BLK of the memory cell array 130, numerous data sets (slots) are stored as key data, and the host device 200 selects which slot out of the key slots should be used in operation. The entire capacity of the data of the slot may be several pages, and also the page length may vary depending on products. However, the address space used actually as RAM in the AES arithmetic device is about 49 bytes. This is very small as compared with the page capacity of 16 kilobytes of the memory cell array 130. Thus, the region of the AES arithmetic device used as RAM for an arithmetic operation is very small.

As shown in FIG. 8A, as the RAM of the AES encrypting circuit 122, before use of the page buffer 133, the region is not divided into a region (working area) as the arithmetic RAM of AES encrypting circuit 122, and a key storage region for storing key information. However, as shown in FIG. 8B, by the means explained below, as the RAM of the AES encrypting circuit 122, when the page buffer 133 is used, the page buffer 133 is divided into and used in a region (working region) 133a as an arithmetic RAM for operating the AES encrypting circuit 122, and a region (key storage region) 133b for storing the key information.

More specifically, as shown in FIG. 8C, a key storage region 133t stores confidential information (Media Key) MKEY, and a plurality of slot keys SLOT_0 to SLOT_E. In a working region 133s, message data MESSAGE is loaded from outside of the NAND chip 100. Further, by the means described below, one set of slot keys out of SLOT_0 to SLOT_E in the key storage region 133t is transferred to the working region 133s, and is used as the slot key (SKEY) used in the operation of the AES encrypting circuit 122. MKEY is also transferred to the working region 133s by the means described below, and is used as MediaKey (MKEY) used in the operation of the AES encrypting circuit 122. After completion of the AES encrypting operation mentioned below, authentication information is written in the working region 133s as shown in FIG. 8D.

Figure 9:
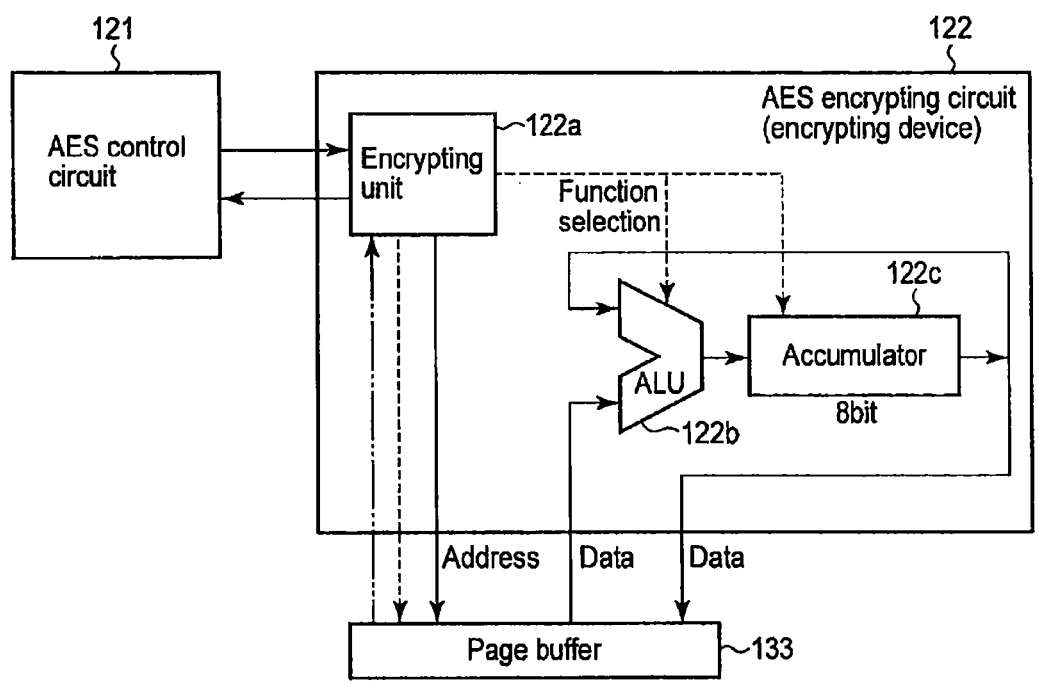
FIG. 9 is a block diagram schematically showing a basic configuration of an AES encrypting circuit in the first embodiment.

Referring now to FIG. 9, a basic configuration of the AES encrypting circuit 122 of the embodiment is described. FIG. 9 is a block diagram schematically showing a basic configuration of the AES encrypting circuit 122 in the embodiment.

As shown in FIG. 9, the AES encrypting circuit 122 includes an encrypting unit 122a, an ALU (arithmetic and logic unit) 122b for calculating for encryption, and an accumulator 122c for storing the operation results temporarily.

The AES encrypting circuit 122 controls the operation of the encrypting process of AES encryption according to a control signal from the AES control circuit 121, and issues a status signal showing a status of operation.

The ALU 122b executes the operation according to the information showing the function selected by the encrypting unit 122a ("function selection" in the diagram). As required, the ALU 122b executes an operation on the data at the address designated by the encrypting unit 122a.

The accumulator 122c is a register for storing results of operation by the ALU 122b. The data stored in the accumulator 122c is written into the page buffer 133 according to an instruction from the encrypting unit 122a.

The AES encrypting circuit 122 executes the operation of AES encryption by using a part of the storage region in the page buffer 133.

The encrypting unit 122a receives a command for encrypting process from the host device 200 by way of the AES control circuit 121, designates the address in the page buffer 133, and controls the ALU 122b to operate the data. The AES encrypting circuit 122 operates according to the procedure determined in the AES encrypting system based on the input data from the host device 200, and returns the data of operation results. This operation may be expressed, for example, in the following formula.

$$R=AES(m, k)$$

R: result, m: message, k: key.

The AES encrypting arithmetic device has five commands as follow, and the operation is carried out in the unit of bytes. Three of them are AES internal operation commands (sbox, xtime, and xor), and other two are two kinds of memory access commands (ld (load) and st (store)).

[Commands of Operation Processing]
1. sbox
2. xtime
3. xor

[Commands for Memory Access]
4. ld (load)
5. st (store)

The method of using the AES encrypting circuit 122 is as follows.

Write input data (message m (16 bytes) and key k (16 bytes)) in the page buffer 133.
Start execution of AES encrypting circuit 122.
Wait for termination of execution of AES encrypting circuit 122.
As the operation result is written in the page buffer 133, read out the operation result from the page buffer 133.

Referring to FIG. 10, a basic configuration and a flow of signals of the AES encrypting device of the embodiment are described. FIG. 10 is a block diagram schematically showing a basic configuration and a flow of signals of the AES encrypting device in the embodiment.

As shown in FIG. 10, the command register 111 in the NAND chip 100 receives a command for starting an AES encrypting sequence by way of the input/output terminal 102 and the input/output control circuit 110, from the host device 200. The command register 111 holds this command, and sends it to the AES control circuit 121 as encryption execution command cmd. After receiving this encryption execution command cmd, the AES control circuit 121 sends signal aes_start to the AES encrypting circuit 122. After receiving this signal aes_start, the AES encrypting circuit 122 starts an AES encrypting sequence.

After receiving the signal aes_start, the AES encrypting circuit 122 returns signal aes_R/B showing an operation status to the AES control circuit 121. For example, in the event of operation process of AES encrypting sequence, the AES encrypting circuit 122 sends a busy signal aes_R/B to the AES control circuit 121.

Further, the AES encrypting circuit 122, if necessary to load or store data during the AES encrypting sequence, transmits signal aes_read/aes_write to the AES control circuit 121. The AES encrypting circuit 122 designates the address of the RAM (page buffer 133) by signal aes_address, and transmits this signal aes_address to the address control circuit (column address control circuit) 123. The address control circuit 123 converts the address signal into a physical address, and transmits signal column_address to the column decoder 134, and thereby a bit corresponding to the pertinent address in the page buffer 133 is designated.

The AES encrypting circuit 122, further, controls the address control circuit 123 depending on the sequence status, and can change the address.

The address control circuit 123 can convert the address supplied from the AES encrypting circuit 122 into an address in the working region 133s of the page buffer 133.

The AES encrypting circuit 122 transmits and receives data with the page buffer 133, by way of 8-bit data line IO_BUS_S (data line linking the logic circuit 120 and the bus control circuit 114 in FIG. 2), the bus control circuit 114, and data line IO_BUS_X. The bus control circuit 114 includes an inverter 114a of which input end is connected to data line IO_BUS_S, an inverter 114b of which input end is connected to the output end of the inverter 114a and output end is connected to data line IO_BUS_S, an inverter 114c of which input end is connected to data line IO_BUS_X, and an inverter 114d of which input end is connected to the output end of the inverter 114c, the input end of the inverter 114a, and the output end of the inverter 114b, and input end is connected to data line IO_BUS_X.

The data line IO_BUS_S has a data check circuit 113 and a temporary register 112. The data check circuit 113 inspects whether error is contained or not in the data when transferring key and other data into the working region 133s in the page buffer 133. The temporary register 112 holds data temporarily in order to transfer the data judged to be free of error into the working region in the data check circuit 113 prior to the AES operation. Also, the data address can be converted in the page buffer 133 by way of the temporary register 112.

The AES control circuit 121 is connected to a data buffer reading sequence 124 for controlling transfer of data from the page buffer 133 into the AES encrypting circuit 122, and a buffer data writing sequence 125 for transferring the data from the AES encrypting circuit 122 into the page buffer.

The AES control circuit 121 receives a command for memory load (read) from the AES encrypting circuit 122, and transmits signal page_load to the buffer data reading sequence 124. The buffer data reading sequence 124 receives the signal page_load, and starts a sub-sequence. The buffer data reading sequence 124, when the operation is terminated, transmits signal load_end to the AES control circuit 121, and the sub-sequence of the buffer data reading sequence 124 is terminated.

The AES control circuit 121 receives a command for memory store (write) from the AES encrypting circuit 122, and transmits signal page_read to the buffer data writing sequence 125. The buffer data writing sequence 125 receives the signal page_read, and starts a sub-sequence. When the operation is terminated, the buffer data writing sequence 125 transmits signal store_end to the AES control circuit 121, and the sub-sequence of the buffer data writing sequence 125 is terminated.

Figure 12:
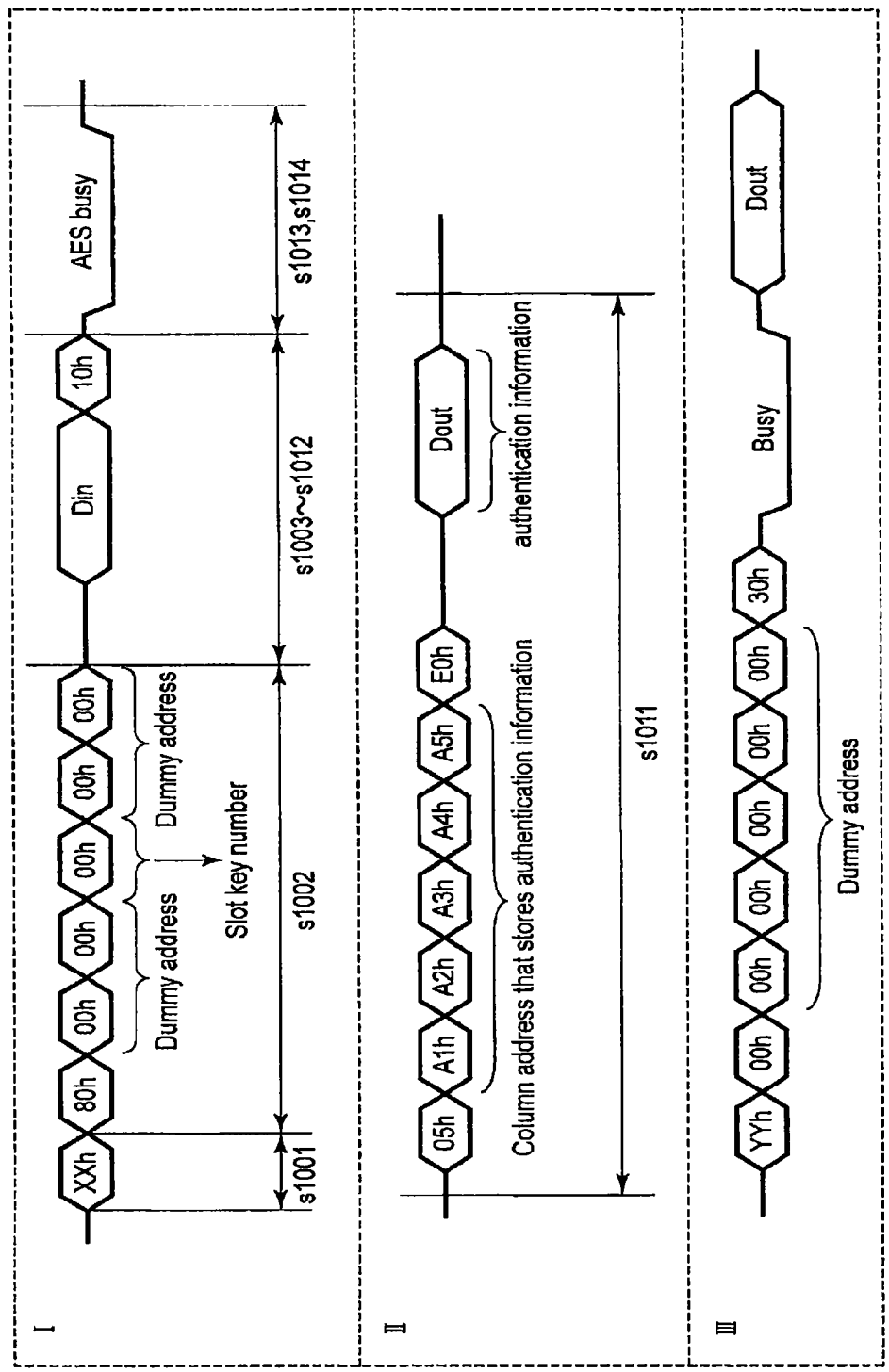
FIG. 12 shows a set of commands to be entered in the NAND chip by a host device in order to execute the AES encrypting sequence in the first embodiment.

Next, the AES encrypting sequence of the embodiment is explained. FIG. 11 is a block diagram showing the AES encrypting sequence 1000. FIG. 12 shows a set of commands to be entered by the host device 200 into the NAND chip 100 (AES control circuit 121) for executing the AES encrypting sequence.

The AES encrypting sequence 1000 is described below.

The AES execution sequence is operated in the steps as shown in FIG. 11.

[Step S1001]

The host device 200 enters message data into the NAND chip 100 (input/output terminal 102). The message data includes, for example, special command XXh for AES sequence at the beginning. The message data entered from the host device 200 is stored in a predetermined address as the AES control circuit 121 supplies trans_address into the address control circuit 123.

[Step S1002]

The host device 200 designates a slot key, and enters it into the NAND chip 100 (input/output terminal 102). More specifically, the host device 200 selects any one of the numerous slots, and determines the slot number. The host device 200 enters ordinary writing address input command 80*h* into the input/output terminal 102, and then the host device 200 enters two cycles of dummy addresses into the input/output terminal 102, and enters a determined lot key number (or address with slot key) into the input/output terminal 102, and successively enters two cycles of dummy addresses into the input/output terminal 102. The NAND chip 100 (address control circuit 123) converts the slot number into a column address.

Usually, addresses are entered in five cycles, and first two cycles are column addresses, and the remaining three cycles denote the row addresses. At step S1002, when the host device 200 enters XXh command into the input/output terminal 102, the block and the page in which key data is written are designated automatically, and dummy addresses are supposed to be entered into the input/output terminal 102 except for the addresses for designating the slot key.
[Step S1003]

The host device 200 enters an AES encrypting execution command into the NAND chip 100 (input/output terminal 102). The host device 200 enters message data Din necessary for AES encrypting operation after the address input. Although 10*h* command is a writing execution command into the memory cell array 130, but if XXh command has been entered at the beginning of this command sequence, the AES control circuit 121 interprets the 10*h* command as an AES encryption execution command, and starts an AES operation sequence.
[Step S1004]

When the host device 200 enters execution command 10*h* into the AES control circuit 121, the AES control circuit 121 reads out the data in the page of the memory cell array 130 in which key information (slot key data) is stored into the page buffer 133. That is, the AES control circuit 121 senses data using the sense amplifier 131, from the page in the corresponding memory cell array 130, in the memory reading sequence 126, and issues a command for storing the reading data in the page buffer 133.

In the memory cell array 130, the slot key stores how many sets of complementary data are stored in a data format. Accordingly, data trans_in is in a data format of complementary data. For the inspection described below, since the slot key is multiplexed and recorded in complementary format, if an error is found in the data as a result of inspection, it is possible to replace with correct data. Similarly, when the media key is also formed in a data format of complementary data, it is possible to check the data as mentioned below.
[Step S1005]

Consequently, the data of the slot key designated at step S1002 is copied into the working region (not shown) of the temporary register 112. The data check circuit 113 checks whether data trans_in is correct data or not, in the process of transfer of data trans_in from the page buffer 133 into the temporary register 112. More specifically, the data check circuit 113 checks the complementary data of key data, and transforms the data trans_in directly into the temporary register 112 if the data is held in a complementary format.
[Step S1006]

If the complementary check at step S1005 is failed, the data check circuit 113 transmits check_flag to the buffer data reading sequence 124 by way of the temporary register 112. Afterwards, the buffer data reading sequence 124 transmits flag_fail to the address control circuit 123. Then, the address control circuit 123 designates other address in which data of same slot key is written, and attempts again to transfer data trans_in to the data check circuit 113. In this way, until the complementary check is successful, checking of data trans_in is repeated. Hence, data from which error bits are removed is stored in the temporary register 112. In this example, if the complementary check is failed, other address in which data of same slot key is designated, but it is not particularly specified.

The complementary check of the slot key that described above is one of the examples, so it is not particularly specified.
[Step S1007]

At step S1005, when complementary check is successful, the data of the slot key designated at step S1002 is copied in the temporary register 112. In this example, the temporary register 112 has at least a storage region of a same size as data length of the slot key, but it is not particularly specified.
[Step S1008]

In order to transfer the data stored in the temporary register 112 into the working region 133*s* of the page buffer 133, the AES control circuit 121 starts a sub-sequence of the buffer data writing sequence 125. The address control circuit 123 designates transfer destination address trans_address in the working region 133*s* in the address control circuit 123. Data trans_out of the temporary register 112 is transferred to the page buffer 133 by way of data line IO_BUS_S, the bus control circuit 114, and data line IO_BUS_X. After completion of data transfer, the address control circuit 123 increments the address, further increments the address of the temporary register 112 in synchronism with this incrementing, and data is transferred to the page buffer 133 by one byte each on every occasion from the temporary register 112. By repeating transfer operation for the portion of the length of the key data, copying of the key data into the working region 133*s* is completed.

In succession, media key is copied from the key storage region 133*t* into the working region 133*s*, in a same method as the method explained about the slot key at the steps S1005 to S1008 above.
[Step 1009]

Next, data of media key is copied into the working region (not shown) of the temporary register 112. The data check circuit 113 checks if data trans_in is correct data or not in the process of transfer from the page buffer 133 into the temporary register 112.
[Step S1010]

If the complementary check at step S1009 is failed, the data check circuit 113 transmits check flag to the buffer data reading sequence 124 by way of the temporary register 112. Afterwards, the buffer data reading sequence 124 transmits flag_fail to the address control circuit 123. Then, the address control circuit 123 designates other address in which data of same media key is written, and attempts again to transfer data trans_in to the data check circuit 113. In this way, until the complementary check is successful, data trans_in is checked repeatedly. Accordingly, data from which error bits are removed is stored in the temporary register 112. In this example, if the complementary check is failed, other address in which data of same slot key is written is designated, but it is not particularly limited to this example.
[Step S1011]

When complementary check at step S1009 is successful, data of the media key is copied in the temporary register 112. In this example, the temporary register 112 has at least a storage region of a same size as the data length of the media key, but it is not particularly specified.
[Step S1012]

In order to transfer the data stored in the temporary register 112 into the working region 133*s* of the page buffer 133, the AES control circuit 121 starts a sub-sequence of the buffer data writing sequence 125. The address control circuit 123 designates transfer destination address trans_address in the working region 133s in the address control circuit 123. At this time, the AES encrypting circuit 122 designates a different address from the working region 133s in which the slot key is copied, in the address control circuit 123 as the copy destination of the media key. Data trans_out of the temporary register 112 is transferred to the page buffer 133 by way of data line IO_BUS_S, the bus control circuit 114, and data line IO_BUS_X. After completion of data transfer, the address control circuit 123 increments the address, further increments the address of the temporary register 112 in synchronism with this incrementing, and data is transferred to the page buffer 133 by one byte each on every occasion from the temporary register 112. By repeating transfer operation for the portion of the length of the key data, copying of the key data into the working region 133s is completed.

[Step S1013]

After the message entered from outside of the chip, the slot key, and the media key are copied into the working region of the AES, the NAND chip 100 (AES encrypting circuit 122) executes an AES encryption, and issues a busy signal aes_R/B (busy) during execution to the host device 200 by way of the AES control circuit 121 and RB (ready/busy) pad (not shown). The RB pad continues to issue the busy signal to the host device 200 until the end of the AES operation sequence.

Figure 13:
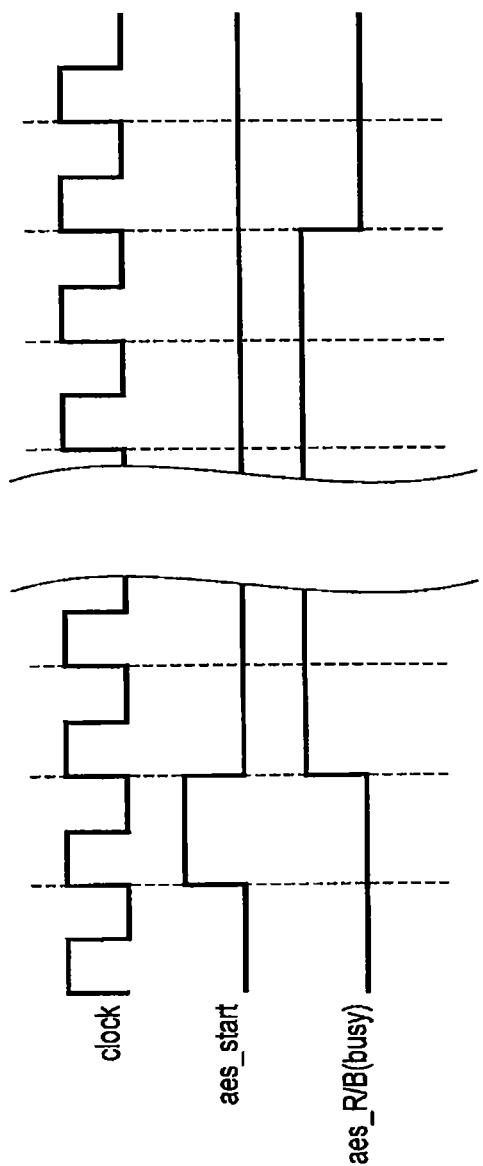
FIG. 13 is a timing chart for execution of a main sequence of encryption.
Figure 14:
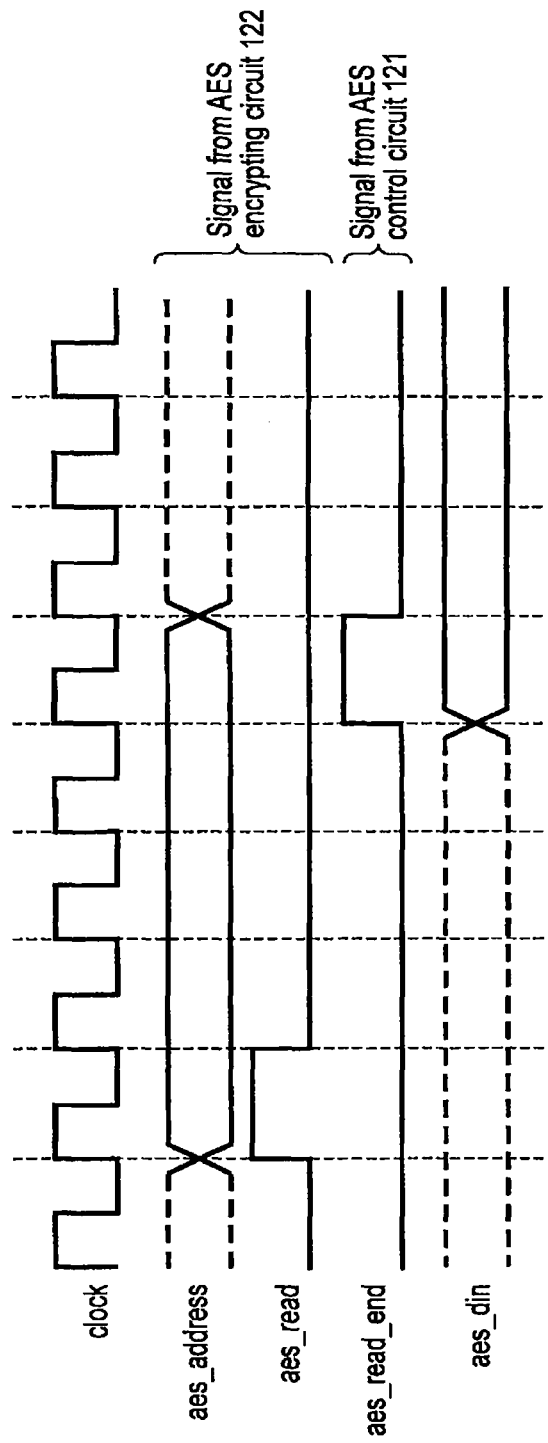
FIG. 14 is a timing chart of the AES encrypting circuit when executing loading of data.
Figure 15:
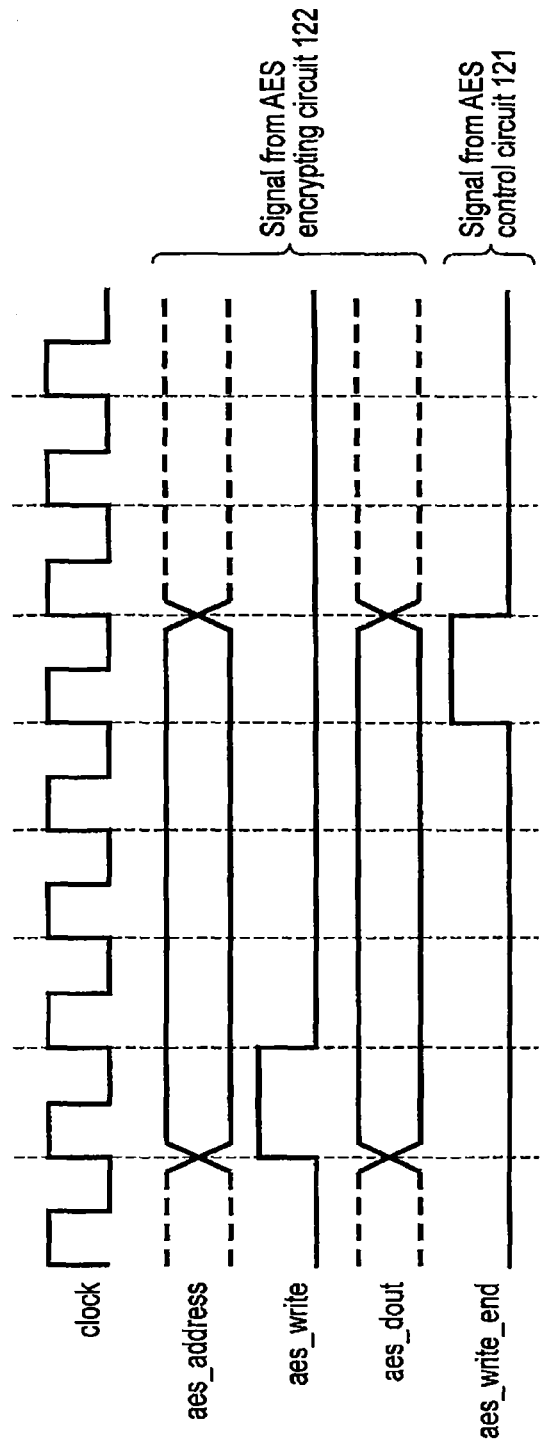
FIG. 15 is a timing chart of the AES encrypting circuit when executing storing of data.

Referring to FIG. 13 to FIG. 15, step S1013 is more specifically described.

FIG. 13 is a timing chart at the time of execution of main sequence of encryption, FIG. 14 is a timing chart of executing of loading of data by the AES encrypting circuit 122, and FIG. 15 is a timing chart of executing storing of data by the AES encrypting circuit 122. Each signal is synchronized in operation with the clock signal clock (not shown) generated inside of the NAND chip 100.

When the message and the key data are ready in the working region 133s in the page buffer 133, as shown in FIG. 13, the AES control circuit 121 transmits signal aes_start to the AES control circuit 121. Receiving this signal, the AES encrypting circuit 122 executes a main sequence of encryption. The AES encrypting circuit 122 continues to issue a busy signal aes_R/B (busy) during the execution of the AES operation.

During the execution of the AES operation by the AES encrypting circuit 122, when the AES encrypting circuit 122 loads or stores the memory, address aes_address of the working region 133s is directly transmitted from the AES encrypting circuit 122 to the address control circuit 123. Loading or storing of the memory is an operation of giving and receiving data between the working region 133s in the page buffer 133 and the AES encrypting circuit 122 during the operation of the AES encrypting circuit 122. More specifically, loading is an operation of reading out the bytes designated by aes_address in the working region 133s into the AES encrypting circuit 122. Storing is an operation of writing the data calculated in the AES encrypting circuit 122 into the address designated by aes_address in the working region 133s. In other words, the AES encrypting circuit 122 randomly accesses the page buffer 133 by aes_address, and reads and writes the memory As shown in FIG. 14, when the AES encrypting circuit 122 is loading, the AES encrypting circuit 122 transmits signal aes_read to the AES control circuit 121, and transmits address aes_address of the working region 133s to the address control circuit 123. Accordingly, the AES control circuit 121 transmits signal page_load to the buffer data reading sequence 124. As a result, the buffer data reading sequence 124 is started, and the page buffer 133 at the address designated by aes_address in the working region 133s is connected to the AES encrypting circuit 122 by way of IO_BUS_X, IO_BUS_S, and aes din. Then, from the buffer data reading sequence 124, load_end signal is transmitted to the AES control circuit 121, and the AES control circuit 121 transmits signal aes_read_end to the AES encrypting circuit 122 as a signal showing termination of data loading, and the AES encrypting circuit 122 receives desired data from the page buffer from aes_din, and the loading operation is completed.

As shown in FIG. 15, when the AES encrypting circuit 122 handles storing, the AES encrypting circuit 122 transmits signal aes_write to the AES control circuit 121, and transmits address aes_address of the working region 133s to the address control circuit 123. Accordingly, the AES control circuit 121 transmits signal page_store to the buffer data writing sequence 125. As a result, the buffer data writing sequence 125 is started, and from aes_dout, a data line is connected to the page buffer 133 by way of IO_BUS_S, IO_BUS_X. Since the data to be stored has been sent from the AES encrypting circuit 122 to aes_dout, this data is transmitted to the page buffer 133 from the above data route, and the data is written into the page buffer 133 corresponding to a desired address aes_address. Then, signal store end is transmitted from the buffer data writing sequence 125 into the AES control circuit 121, and the AES control circuits 121 transmits aes_write_end signal to the AES encrypting circuit 122 as a signal showing the termination of data storing, and the storing operation is completed.

In this case, since there is no error in the data in the working region 133s, complementary data check by the data check circuit 113 is not needed.

[Step S1014]

In this step, after the end of a series of AES encrypting sequence, AES encrypting circuit 122 reset confidential information except for the operation result, for example key date, which is stored in the data latch. More specifically, for example, AES encrypting circuit 122 moves operation result into the temporary register 112, after the data latch is reset, AES encrypting circuit 122 moves the operation result from the temporary register 112 to the data latch.

Described above, key data of the key storage block is prohibited to read out from outside of the NAND chip 100. If the NAND chip 100 turns into ready status in spite of data latch stores the key information, there is risk for the key information are read out from the NAND chip 100. However, in this step, the NAND chip 100 turns into ready status after the key information is eliminate from the data latch. Furthermore, in these sequences described above, in a case where asynchronous reset command is entered in a step after step 1004 for reading a key data, a data latch can be reset to terminate the sequence at this step from the similar reason.

[Step S1015]

After the end of a series of AES encrypting sequence, AES encrypting circuit 122 transmits ready signal aes_R/B (ready) to the AES control circuit 121 from the AES encrypting circuit 122. The AES control circuit 121 sends out ready signal aes_R/B (ready) to the host device 200 by way of the RB (ready/busy) pad (not shown). As a result, the NAND chip 100 is in ready status. In the working region 133s in the page buffer 133, the only data is left over as the AES encrypting operation result.

[Step S1016]

The host device 200 reads out the operation result from the working region 133s in the page buffer 133. The host device 200, after the end of AES encrypting operation sequence, reads out the authentication information left over in the working region 133s in the page buffer 133. At this time, the host device 200 using a command sequence (see FIG. 12-II) similar to an ordinary register (page buffer) reading out command sequence, as the command sequence for reading out the authentication information. Otherwise, the host device 200 reads out the operation result using a command sequence, as shown in FIG. 12-III. The host device 200 enters special command YYh for read out operation result, then the host device 200 enters command 00h, five cycles of dummy addresses, and command 30h into the input/output terminal 102. When the host device 200 enters the command YYh into the input/output terminal 102, address in the working region 133s in the page buffer 133 that is stored the operation result is automatically designated, in spite of the dummy addresses that are entered by the host device 200. After the host device 200 enters the command 30h, the NAND chip 100 turns into busy status. When the NAND chip 100 turns into ready status, the NAND chip 100 can output the authentication information to the outside of the NAND chip 100.

According to the first embodiment described herein, the nonvolatile semiconductor storage device (NAND chip 100) of the first embodiment includes the encrypting circuit (AES encrypting circuit) 122 for executing an operation of a predetermined encrypting system, the memory cell array 130 preliminarily storing complementary data to be used in the operation, and the page buffer 133 having the first region (key storage region) 133t for storing the data being read out from the memory cell array 130, and the second region (working region) 133s used at the time of execution of the operation. The nonvolatile semiconductor storage device further includes the register (temporary register) 112 for storing the data from the first region 133t, and supplying the stored data into the second region 133s, and the inspection circuit 113 for judging presence or absence of error in the data when storing the data into the register 112, and storing the data into the register 112 when the data is judged to be free from error. The nonvolatile semiconductor storage device moreover includes the control circuit (AES control circuit) 121 for controlling for reading out the data from the memory cell array 130 into the first region 133t, and controlling for reading out the data from the first region 133t into the second region 133s, and the address control circuit 123 for designating the address of the page buffer 133 or the memory cell array 130, based on the signal supplied from the control circuit 121. The control circuit 121 controls the address control circuit 123, and supplies the data from the first region 133t into the second region 133s, and when the inspection circuit 113 detects an error in the data (step S1005), the address control circuit 123 is notified of the error, and the address control circuit 123 receives the notice, and designates other address in which data of same contents as the data in the page buffer 133 is stored, and thereby the inspection circuit 113 judges presence or absence of error in the data in the other address (step S1006).

In this manner, as the NAND chip 100 in the first embodiment utilizes the page buffer 133 as the RAM for AES operation, over-heading of the area is suppressed, and the function of AES can be realized by the configuration within the NAND chip 100 only, not depending on the host device 200.

In the meantime, the page buffer 133 of the NAND chip 100 is basically based on batch access of large-scale data, and it is different from the RAM used in an ordinary arithmetic device. More specifically, when the page buffer 133 is used as a storage device for the AES encrypting device, the AES encrypting circuit 122 may be required to recognize an address space corresponding to the page length of the memory cell array 130. In this case, the number of address lines in the AES encrypting circuit 122 is increased, and the circuit scale of the peripheral circuits becomes larger. Moreover, depending on the products, the page length or the number of slots may be different, and every time the AES operation circuit may need to be modified.

In addition, by thinning the size of the NAND chip 100, the reliability of the memory cell array 130 deteriorates, and bit errors tend to increase. In order to use the memory cell array 130 as a key storage device for storing key information and other data to be used in AES encrypting operation, data errors in key information or the like must be eliminated.

Accordingly, various measures should be required in order to use the page buffer 133 as a storage device for the AES encrypting device, and further before starting operation of the AES encrypting circuit 122, it is required to guarantee that there is no bit error by inspecting the data such as key information by some method.

In this embodiment, therefore, the page buffer 133 is divided into regions, that is, the working region 133s functioning as a RAM used in AES encrypting operation process, and the key storage region 133t for storing key information and other data. By using the temporary register 112, data is moved from the key storage region 133t to the working region 133s to be used in the AES encrypting operation. Hence, it is possible to suppress increase in the number of address lines or the like, and to use the page buffer 133 as a RAM for AES encrypting operation process.

Further, as in the embodiment, by using the data check circuit 113, errors in the key information and other data can be checked before starting AES encrypting operation process, so that data such as error-free key information can be guaranteed.

Thus, by realizing these measures, the AES encrypting operation can be realized without forming a configuration of AES operation outside the NAND chip. That is, the nonvolatile semiconductor storage device (NAND chip) incorporating the encrypting device can be realized.

So far, the method of using the page buffer 133 as a RAM for the AES encrypting device has been explained, and even when, instead of the AES encrypting device, operators relating to ECC, security and others are provided in the NAND chip 100, the page buffer 133 may be used as the RAM for these operators in a similar method.

The data check circuit 113 used in the AES encrypting sequence, the buffer data reading sequence 124, the buffer data writing sequence 125, and other circuits may be replaced, if possible, by circuits for controlling the power-on read operation provided preliminarily in the NAND. The power-on read operation refers to an operation of reading out data stored in the ROM fuse region of the memory cell array 130 when the power is supplied in the NAND chip 100. If a part of the circuits for controlling the power-on read operation can be utilized, it is effective to suppress increase in the circuit area.

(Modified Example 1)

Next, modified example 1 of the first embodiment is described. In modified example 1 of the first embodiment, this is to explain that controlling is done, whether the complementary checking of slot key data is successful or unsuccessful, so that the busy time required for AES encrypting operation is nearly the same in duration. The basic configuration and the basic operation of the nonvolatile semiconductor storage device in modified example 1 of the first embodiment similar to those of the nonvolatile semiconductor storage device of the first embodiment described above. Therefore, the matters explained in the first embodiment and those easily estimated from the first embodiment are not particularly described herein.

Further, in the first embodiment, as shown at steps S1007 and 1011 in FIG. 11, the key data successful in complementary check is recorded in the temporary register 112. However, in modified example 1, if complementary check is unsuccessful for more than a specified number of time (or on all keys), the failing key data is copied in the temporary register 112.

At step S1005 shown in FIG. 11 of the first embodiment, if the complementary check in the data check circuit 113 is a failure in all slot keys, correct slot key data is not obtained. That is, while correct slot key data is not obtained, step S1013 in FIG. 11 of the first embodiment may be carried out in this state. In this case, since slot key data is not stored in the temporary register 112, at the stage of performing the AES encrypting sequence at step S1013, it is known that correct encrypting operation result is not obtained.

However, in the entire sequence at step S1013, in the case that the occupying time rate in the AES encrypting operation is large, if the sequence at step S1013 is terminated immediately only because correct encrypting operation result is not obtained, the busy time of the entire sequence at step S1013 may vary significantly depending on whether the complementary check of the slot key is successful or not.

In this manner, the busy time of the entire sequence at step S1013 fluctuates significantly depending on success or failure of the key complementary check, which may be not preferable for the host device 200 in certain cases.

Figure 16:
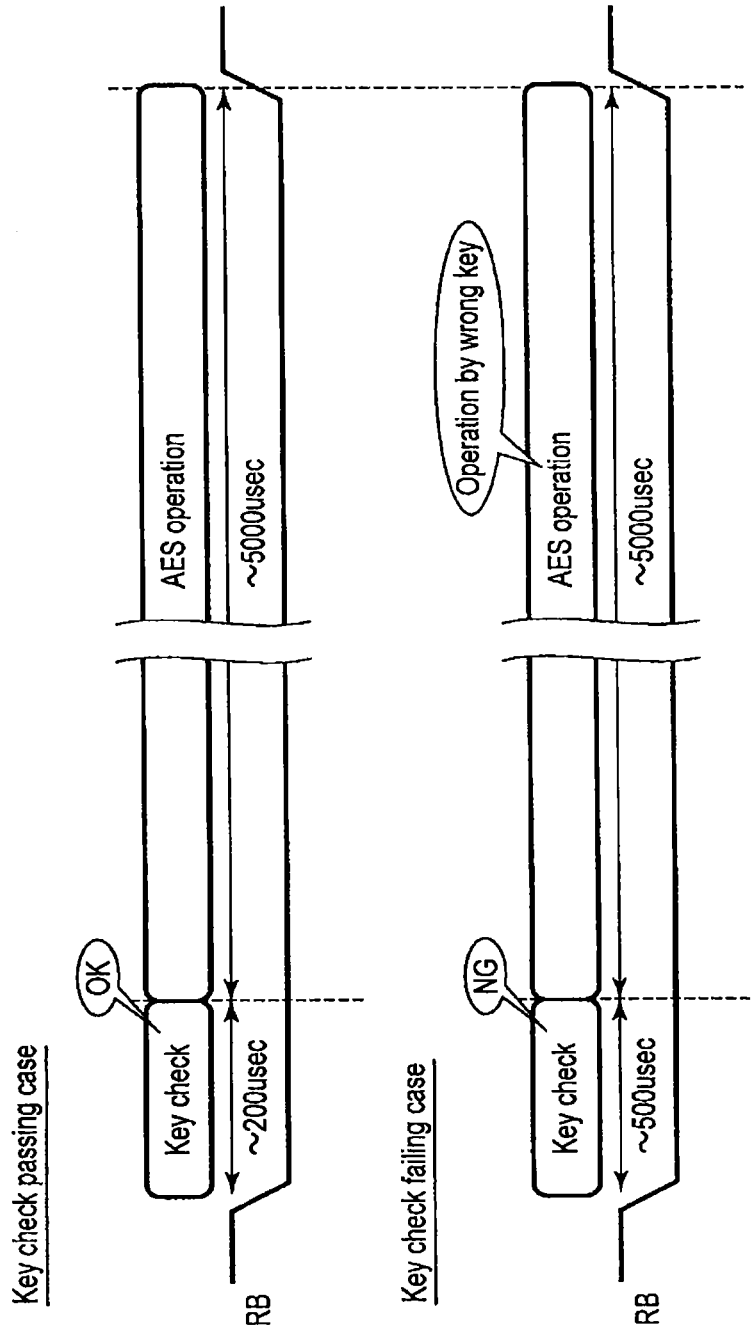
FIG. 16 is a diagram showing the relation of affirmative and negative result of key and the time required for operation of AES encryption in the first embodiment.

FIG. 16 is a diagram showing the relation between success or failure of the key, and the time required for AES encrypting operation in AES encrypting operation in the first embodiment.

As shown in FIG. 16, in modified example 1, at step S1005 shown in FIG. 11 of the first embodiment, if the complementary check is all failure, arbitrary fail (error) data is stored in the temporary register 112. By using the error data stored in the temporary register 112, an AES encrypting operation is performed, and an operation result is issued. As a result, whether the complementary check of slot key data is successful or unsuccessful, the busy time of the entire sequence at step S1013 is kept constant.

Incidentally, after termination of the AES encrypting operation (authentication operation), to determine whether the key used in the authentication operation has passed or failed the complementary check, two methods may be considered as explained below.

Figure 17:
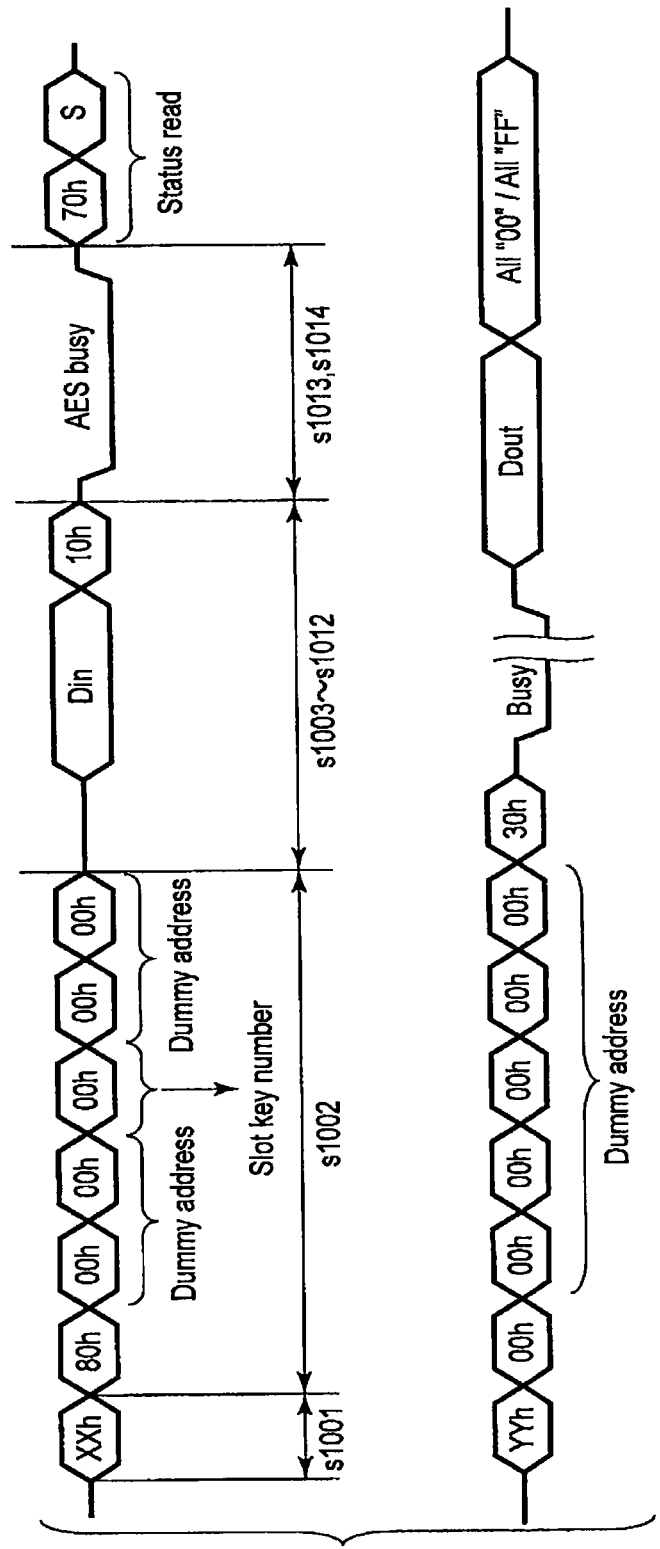
FIG. 17 shows a set of commands to be entered in the NAND chip from the host device in order to execute the AES encrypting sequence in the first embodiment.
Figure 18:
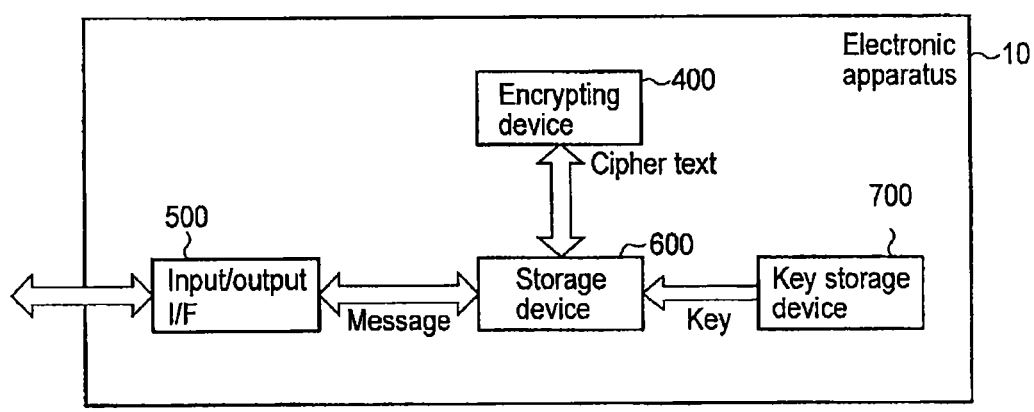
FIG. 18 is a block diagram of an electronic apparatus including an encrypting device in a third embodiment.
Figure 21:
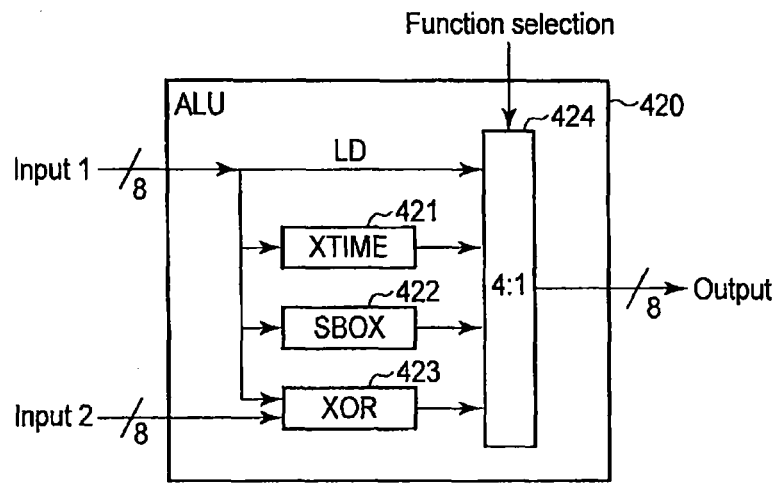
FIG. 21 is a block diagram of an ALU in the third embodiment.

FIG. 17 shows a set of commands to be entered in the NAND chip by the host device in order to execute the AES encrypting sequence in the first embodiment.
<First Method>

As shown in FIG. 17, in the first method, after the command sequence shown in FIG. 12 (XXh-80h-, . . . 10h-Busy-Ready), when a status read command is applied (status read), the information showing whether the key used in the authentication operation has passed or failed the complementary check is reflected in the status data as the status read result. As a result, for example, the host device 200 can recognize whether the key used in the authentication operation has passed or failed the complementary check.
<Second Method>

As shown in FIG. 17, in the second method, in the command sequence for reading out the authentication information (YYh-00h-, . . . 30h-Dout), when the data is read out in a time longer than a designated authentication information length (16 B), if the key check is successful, data "00h" (A11"00") is read out, and if the key check is unsuccessful, data "FFh" (A11"FF") is read out. As a result, for example, the host device 200 can recognize whether the key used in the authentication operation has passed or failed the complementary check.

Accordingly, in modified example 1 of the first embodiment, whether the complementary check of slot key data is successful or not, the AES encrypting operation is carried out. As a result, it is controlled so that the busy time required in AES encrypting operation is nearly same in duration.

Therefore, whether the complementary check of slot key data is successful or not, it is possible to keep constant the busy time of the entire sequence at step S1013. As a result, the host device 200 may avoid undesired problem of large fluctuation of busy time of the entire sequence at step S1013 depending on success or failure of complementary check of slot key data.
(Second Embodiment)

A second embodiment is described below. In the NAND chip 100 of the second embodiment, a part of the operating parts of the AES encrypting circuit 122 is used commonly as the arithmetic unit 132, and the circuit scale can be further reduced in the AES encrypting circuit 122.

As shown in FIG. 5, an operator YB is provided between a sensing part SA and a buffer circuit. This operator YB is provided in each sensing part SA. The operator YB can calculate, for example, a Boolean algebra between arbitrary buffer circuits, and store the result in the buffer circuits. The operator YB is also used in NAND writing and reading, and other ordinary operations.

The operator YB can operate all columns in a lump, for example, by an instruction from a specified control circuit.

According to the second embodiment, the nonvolatile semiconductor storage device (NAND chip 100) in the second embodiment further includes the arithmetic unit 132 provided between the memory cell array 130 and the page buffer 133, and the arithmetic unit 132 executes a part of the operation performed by the encrypting circuit 122.

When the operator YB is commonly used in the operation performed by the AES encrypting circuit 122, the circuit scale of the ALU 122b can be reduced, or without using ALU 122b, the arithmetic function of the AES encrypting circuit 122 can be executed. As a result, the circuit scale of the NAND chip 100 may be further reduced. Since the operator YB can be used in parallel in operation, the operation speed may be further enhanced.
(Third Embodiment)

A third embodiment is described below.

The third embodiment relates to a circuit inside an AES encrypting operation circuit reduced in the size of the AES operation circuit by using a storage device in a system for assembling an AES operation circuit in a RAM (random access memory) to be used in the AES encrypting circuit. Downsizing of the AES operation circuit based on such viewpoint has not been known so far.

In the following embodiments, the arithmetic device is applied in the encrypting device (third embodiment) and the decoding device (fourth embodiment) of the AES encrypting system, and descriptions thereof are as follows.

An outline of a configuration of the encrypting device of the embodiment is described. AES encryption is operated and processed basically in the unit of bytes. ShiftRows is a reshuffling of byte units in 16 bytes. Actually, for reshuffling by ShiftRows, a storage device as a buffer is needed in addition to 16 bytes. MixColumns is a conversion in the unit of 4 bytes, but conversion cannot be executed until 4 bytes of input are ready.

In the embodiment, AES is realized only by five commands (dummy commands) of minimum requirement. Five commands are three operation commands (sbox, xtime, and xor), and two memory access commands (ld (load) and st (store)). In addition, as a register for storing the operation result, an 8-bit accumulator is provided. By these commands, a control unit is provided as a sequence machine for executing the AES encryption by hardware. The details of the commands and component parts are described below.

Figure 22:
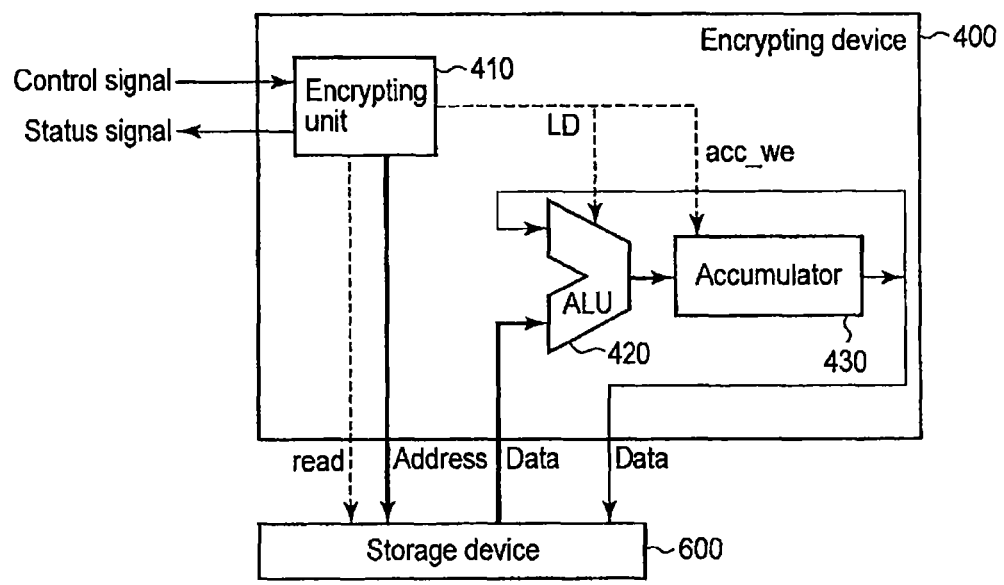
FIG. 22 is a diagram showing a processing example of ld command.

FIG. 22 is a block diagram showing an example of a configuration of the electronic apparatus 10 including an encrypting device 400 in the third embodiment. As shown in FIG. 22, the electronic apparatus 10 includes the encrypting device 400, an input/output interface (input/output IF) 500, a storage device 600, and a key storage device 700.

The storage device 600 stores various data handled in the electronic apparatus 10. The storage device 600 is a storage medium which enables accessing the data by designating an address storing data. The storage device 600 may be realized, for example, by a RAM.

The input/output IF is an interface for transmitting and receiving data to and from outside according to an instruction from a control circuit (not shown). The key storage device 700 stores the key information used in the encrypting process. The encrypting device 400 is connected to the storage device 600, and executes an operation of AES encrypting system. The storage device 600 may be replaced by a RAM for page buffer. The key storage device 700 may be replaced by a NAND flash. The storage device 600 is either volatile memory or nonvolatile memory. The key storage device 700 is a nonvolatile memory. For the storage device 600 and the key storage device 700, physically a same memory may be used.

The control circuit executes AES encryption, for example, as explained below.

(1) Read out data (message) to be encrypted by way of the input/output IF, and write into the storage device 600.

(2) Read out key information from the key storage device 700, and write into the storage device 600.

(3) Instruct the encrypting device 400 to execute an operation. As a result, a cipher text is written into the storage device 600 as the operation result.

FIG. 23 is a block diagram showing an example of a configuration of the encrypting device 400 in the third embodiment. As shown in FIG. 23, the encrypting device 400 includes an encrypting unit 410, an ALU (arithmetic logic unit) 420 as an arithmetic unit, and an accumulator 430.

The encrypting unit 410 controls the operation of AES encrypting process according to a control signal from the control circuit in the electronic apparatus 10 explained in FIG. 22, and issues a status signal showing the status of the operation. The detail of the encrypting unit 410 is described below.

The ALU 420 executes an operation according to the information showing the function selected by the encrypting unit 410 ("function selection" in FIG. 23). The ALU 420, as required, executes an operation on the data at the address designated by the encrypting unit 410.

The accumulator 430 is a register for storing the operation result by the ALU 420. The data stored in the accumulator 430 is written into the storage device 600 according to an instruction from the encrypting unit 410.

The encrypting device 400 executes an operation of AES encryption using a part of the storage region in the storage device 600. The contents of the storage region necessary in the storage device 600 are as follows.

Size of entire storage region to be used=49 bytes.
Input message m=16 bytes.
Input key k=16 bytes.
Working region w=16 bytes.
Round constant rc=1 byte.

A cipher text as the operation result is written on the message m.

The method of using the encrypting device 400 in FIG. 23 is as follows.

Write input data (message m (16 bytes) and key k (16 bytes)) into the storage device 600.
Start execution of the encrypting device 400.
Wait for the end of execution of the encrypting device 400.
Since the operation result is written into the storage device 600, read out the operation result from the storage device 600.

Herein, dummy codes in encrypting processing in the AES encrypting system according to the embodiment are explained. First, simplified dummy codes (simple edition dummy codes) are described.

```
//input m: message, k: key
round=0
rc=0x01
m=AK (m,k) //AddRoundKey
while (1) {
k=KS (k) //KeyExpansion
m=SB (m) //SubBytes
w=SR (m) //ShiftRows
round=round+1
if (round==10) break; //exit while loop
m=MC (w) //MixColumns
m=AK (m, k) //AddRoundKey
rc=xtime (rc) //rc update
}
m=AK (w,k) //AddRoundKey
```

The functions of the dummy codes respectively correspond to the following functions as determined by the AES ciphers. The functions determined by the AES ciphers are functions defined individually in FIPS197 (Federal Information Processing Standards Publication on 197_, the National Institute of Standards and Technology (NIST).
AK: AddRoundKey
KS: KeyExpansion
MC: MixColumns
SB: SubBytes
SR: ShiftRows Next, detailed AES dummy codes (detailed edition dummy codes) are described below. The detailed edition dummy codes are specific examples of functions (AK, KS, SB, SR, MC, etc.) of the simplified edition dummy codes.

(1) Read out data (message) to be encrypted by way of the input/output IF, and to write into the storage device 600.

(2) Read out the key information from the key storage device 700, and write into the storage device 600.

(3) Instruct the encrypting device 400 to operate. As a result, a cipher text is written into the storage device 600 as the operation result.

FIG. 23 is a block diagram showing an example of a configuration of the encrypting device 400 in the third embodiment. As shown in FIG. 23, the encrypting device 400 includes an encrypting unit 410, an ALU (arithmetic logic unit) 420 as an arithmetic unit, and an accumulator 430.

The encrypting unit 410 controls the operation of AES encrypting process according to a control signal from the control circuit in the electronic apparatus 10 explained in FIG. 22, and issues a status signal showing the status of the operation. The detail of the encrypting unit 410 is described below.

The ALU 420 executes an operation according to the information showing the function selected by the encrypting unit 410 ("function selection" in FIG. 23). The ALU 420, as required, executes an operation on the data at the address designated by the encrypting unit 410.

The accumulator 430 is a register for storing the operation result by the ALU 420. The data stored in the accumulator 430 is written into the storage device 600 according to an instruction from the encrypting unit 410.

The encrypting device 400 executes an operation of AES encryption by using a part of the storage region in the storage device 600. The contents of the storage region necessary in the storage device 600 are as follows.

Size of entire storage region to be used=49 bytes.
Input message m=16 bytes.
Input key k=16 bytes.
Working region w=16 bytes.
Round constant rc=1 byte.

A cipher text as the operation result is written on the message m.

The method of using the encrypting device 400 in FIG. 23 is as follows.

Write input data (message m (16 bytes) and key k (16 bytes)) into the storage device 600.
Start execution of the encrypting device 400.
Wait for the end of execution of the encrypting device 400.
Since the operation result is written into the storage device 600, read out the operation result from the storage device 600.

Herein, dummy codes in encrypting processing in the AES encrypting system according to the embodiment are explained. First, simplified dummy codes (simple edition dummy codes) are described.

```
//input m: message, k: key
round=0
rc=0x01
m=AK (m, k) //AddRoundKey
while (1) {
  k=KS (k) //KeyExpansion
  m=SB (m) //SubBytes
  w=SR (m) //ShiftRows
  round=round+1
  if (round==10) break; //exit while loop
  m=MC (w) //MixColumns
  m=AK (m, k) //AddRoundKey
  rc=xtime (rc) //rc update
}
m=AK (w, k) //AddRoundKey
```

The functions of the dummy codes respectively correspond to the following functions as determined by the AES ciphers. The functions determined by the AES ciphers are functions defined individually in FIPS197 (Federal Information Processing Standards Publication 197, the National Institute of Standards and Technology (NIST).

AK: AddRoundKey
KS: KeyExpansion
MC: MixColumns
SB: SubBytes
SR: ShiftRows

Next, detailed AES dummy codes (detailed edition dummy codes) are described below. The detailed edition dummy codes are specific examples of functions (AK, KS, SB, SR, MC, etc.) of the simplified edition dummy codes. Thus, in the embodiment, the AES is realized by five commands, that is, sbox, xtime, xor, ld, and st.

FIG. 25 is a block diagram showing an example of a configuration of the ALU 420 in the third embodiment. As shown in FIG. 25, the ALU 420 includes an XTIME 421, an SBOX 422, an XOR 423, and a selector 424. The XTIME 421, SBOX 422, and XOR 423 are the circuits for executing the above three arithmetic processes (sbox, xtime, and xor). The selector 424 selects and issues any one of the data (LD) being read out from the storage device 600, the operation result from the XTIME 421, the operation result from the SBOX 422, and the operation result from the XOR 423. In this way, the ALU 420 executes any one of four arithmetic processes ld, xtime, sbox, and xor, according to the instruction of the function selection by the encrypting unit 410.

Flows of processing in the encrypting device 400 when five commands are executed are explained by referring to FIG. 26 to FIG. 29. FIG. 26 is a diagram showing a processing example in the encrypting device 400 when command ld is executed.

In command ld, an address is designated (issued) from the encrypting unit 410, and the data of the designated address in the storage device 600 is read out, and is written into the accumulator 430 by way of the ALU 420. In FIG. 26, "acc-we" shows a signal for instructing writing into the accumulator 430. In FIG. 26, "read" shows a signal for instructing reading of data from the storage device 600.

FIG. 27 is a diagram showing a processing example in the encrypting device 400 when command st is executed. In command st, an address is designated (issued) from the encrypting unit 410, and the data stored in the accumulator 430 is written into the designated address in the storage device 600. In order to show that the data stored in the accumulator 430 is not changed, in FIG. 26, the acc-we signal is provided with an upper line as a negative sign. On the other hand, "write" shows a signal for instructing data writing into the storage device 600.

Figures 28, 29:
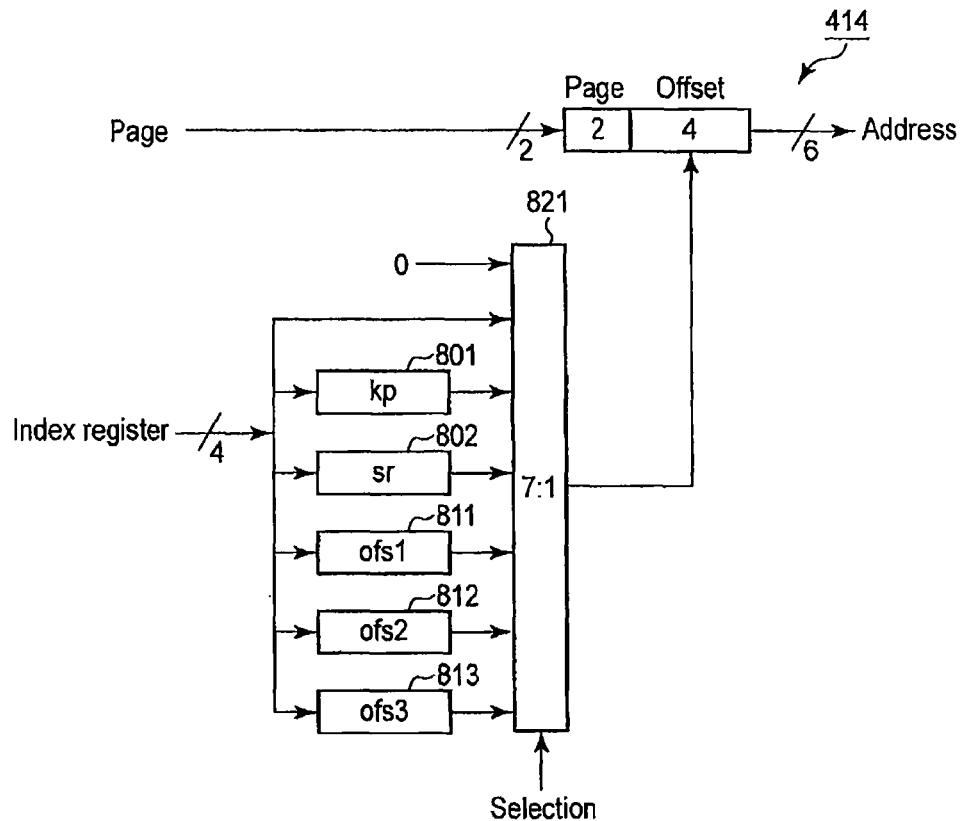
FIG. 28 is a block diagram of an address generating unit in the third embodiment.
FIG. 29 is a diagram showing input and output of functions corresponding to each circuit in FIG. 28.

FIG. 28 is a diagram showing a processing example in the encrypting device 400 when command xor is executed. In command xor, an address is designated (issued) from the encrypting unit 410, and the data stored in the accumulator 430 and the data at the designated address in the storage device 600 are calculated, and the operation result of an exclusive OR is written into the accumulator 430.

FIG. 29 is a diagram showing a processing example in the encrypting device 400 when commands sbox and xtime are executed. Although the functions are different between sbox and xtime, the operations are similar, and are shown in the same diagram. In sbox command (xtime command), an SBOX (XTIME) function is applied to the data stored in the accumulator 430, and the operation results are written into the accumulator 430.

FIG. 30 is a block diagram showing an example of a configuration of the encrypting unit 410 in the third embodiment. As shown in FIG. 30, the encrypting unit 410 includes a controller 411, a round counter 412, an index register 413, and an address generating unit 414.

The controller 411 issues various control signals according to control signals from outside devices such as control circuit (not shown) in the electronic apparatus 10, and controls the operation of the encrypting process according to the procedure determined depending on the AES encrypting system. The dotted line in FIG. 30 shows that control signals are issued to individual parts from the controller 411. The detail of the control signals is described later.

The controller 411 receives various control signals, such as operation resetting signal of AES encryption, and operation start instructing signal. The controller 411 issues status signals (busy, end, etc.) showing the processing status to, for example, input sources of control signals.

The ALU function selection represents a signal showing whether to execute any function (operation) to the ALU 420. Acc writing shows a signal for designating whether or not to write data into the accumulator 430. Memory R/W shows a signal for designating whether to read (R) data from the storage device 600, or to write (W) data into the storage device 600.

The round counter 412 is a counter for counting the number of rounds of the AES cipher. The round counter 412 may be, for example, constituted of flip-flop. The index register 413 is a register for storing the counter value (ix) used for generating an address by the address generating unit 414. In this embodiment, the index register 413 stores a 4-bit counter value.

The address generating unit 414 generates and issues a 6-bit address, from the 2-bit value (page) issued from the controller 411, and the 4-bit counter value ix of the index register 413.

Here is a description about an address space in the storage region in the storage device 600 used in the encrypting device 400 in the embodiment. FIG. 27 is a diagram showing an example of an address space used in the third embodiment.

FIG. 27 shows an example of using continuous addresses in the sequence of message m, key k, working region w, and round constant rc. However, the address arranging sequence is not particularly limited to the sequence For example, as far as the addresses are continuous in each byte of 16-byte data (message m, key k) or 16-byte working region w, addresses may not be continuous in each data or a working region.

FIG. 31 is a block diagram showing an example of a configuration of the address generating 414 in the third embodiment. As shown in FIG. 31, the address generating unit 414 includes kp801, sr802, ofs1 (811) (hereinafter simply called ofs1), ofs2 (812) (hereinafter simply called ofs2), ofs3 (813) (hereinafter simply called ofs3), and a selector 821.

Specifically, kp801, sr802, ofs1, ofs2, and ofs3 are circuits for individually converting 4-bit counter values ix entered from the index register. FIG. 32 is a diagram showing an example of input and output of functions corresponding to the circuits in FIG. 31.

For example, kp (x) is a function for output of "13" when the counter value ix (corresponding to x in the table in FIG. 32) is 0. Function kp (x) is based on the data access sequence of 13, 14, 15, 12, 0, 1, 2, 3, 4, 5, 6, 7, 8, 9, 10, 11, in the key expansion process (KeyExpansion). Function sr (x) reflects the process contents of ShiftRows for reshuffling of 16 bytes.

Functions ofs1 (x) to ofs3 (x) are functions in which 1 to 3 of 2 bits are added to the lower 2 bits of x, but upper 2 bits of x are unchanged.

The selector 821 selects and issues any one of 0, count value ix, output of kp801, output of sr802, output of ofs1, output of ofs2, and output of ofs3, according to an instruction (dotted line in FIG. 30) from the controller 411.

As shown in the upper right corner in FIG. 31, the address generating unit 414 issues an address by combining the 2-bit page entered from the controller 411, and the 4-bit value (corresponding to the offset) issued from the selector 821. Thus, the page becomes the higher 2 bits of the address, and, for example, the result of modifying the index register by each function becomes the lower 4 bits of the address. The page is used as specific information for designating the type of data used in arithmetic processing and a working region in the storage device 600 used in arithmetic processing. For example, the page includes four values for specifying four values, that is, the message m, the key k, the working region w, and the round key rc. Accordingly, in this embodiment, the page is expressed in 2 bits.

Figures 33, 34:
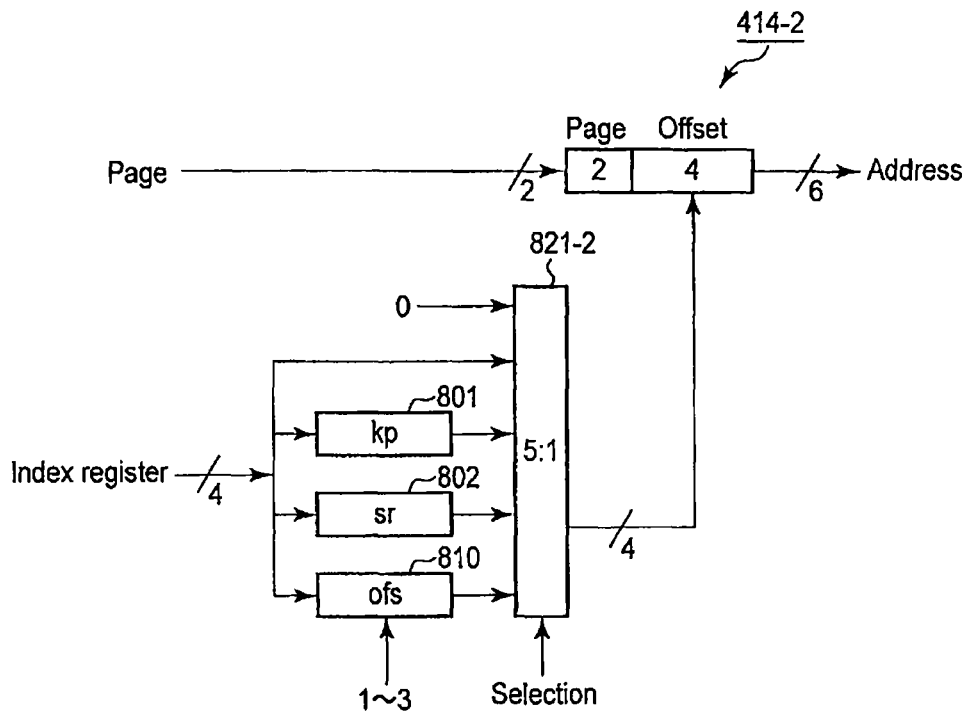
FIG. 33 is a block diagram of an address generating unit in a modified example of the third embodiment.
FIG. 34 is a diagram showing input and output of functions corresponding to each circuit in FIG. 33.

Next, the encrypting process by the encrypting device 400 in the third embodiment having such configuration is described by referring to FIG. 33. FIG. 33 is a flowchart showing an entire flow of encrypting process in the third embodiment. FIG. 33 corresponds to a diagram in which simplified edition dummy codes of AES are described in a flowchart.

First of all, the round number counter (round) and the round constant (rc) are initialized to 0 and 1, respectively (step S8001). Next, AddRoundKey is executed, and the message m is updated (step S8002). Further, KeyExpansion (step S8003), SubBytes (step S8004), and ShiftRows (step S8005) are executed sequentially, and 1 is added to the round number (step S8006).

If the round number is less than 10 (No at step S8007), further MixColumns (step S8008), AddRoundKey (step S8009), and xtime (step S8010) are executed. Afterwards, returning to step S8003, the process is repeated. When the round number reaches 10 (Yes at step S8007), AddRoundKey is executed (step S8011), and the encrypting process is terminated.

SR (ShiftRows) is a reshuffling of 16 bytes, but since the original values are lost by overwriting, bytes are reshuffled while copying into working region w which is other region (step S8005). This process (step S8005) may be expressed in the following codes when described in C language.

for(i=0; i<16; i++) {w[i]=m[sr[i]]; }

In the above codes, variable sr is int sr[16]={0,5,10,15,4, 9,14,3,8,13,2,7,12,1,6,11}; and hence the above codes are same as when the following substitutes are inserted.

w[0]=m[0]
w[1]=m[5]
w[2]=m[10]
w[3]=m[15]
w[4]=m[4]
w[5]=m[9]
w[6]=m[14]
w[7]=m[3]
w[8]=m[8]
w[9]=m[13]
w[10]=m[2]
w[11]=m[7]
w[12]=m[12]
w[13]=m[1]
w[14]=m[6]
w[15]=m[11]

If attempted to execute sequentially by one variable alone, values necessary for further operation are overwritten and lost, and hence the sequence is switched while copying into different variables.

MC (MixColumn) is also accompanied by the same problem of overwriting of values, it is switched while copying into other variables (step S8008).

According to the AES encryption standard (FIPS-197), it is required to calculate as follows:

$$m[0]=xtime(w[0])\hat{\ }xtime(w[1])\hat{\ }w[1]\hat{\ }w[2]\hat{\ }w[3]$$

On the other hand, because of xtime (a) ^xtime (b)=xtime (a^b), xtime may be calculated in a lump as follows:

$$m[0]=xtime(w[0]\hat{\ }w[1])\hat{\ }w[1]\hat{\ }w[2]\hat{\ }w[3]$$

In the entire MC, the calculation is calculated as follows:

$$m[0]=xtime(w[0]\hat{\ }w[1])\hat{\ }w[1]\hat{\ }w[2]\hat{\ }w[3]$$

$$m[1]=xtime(w[1]\hat{\ }w[2])\hat{\ }w[2]\hat{\ }w[3]\hat{\ }w[0]$$

$$m[2]=xtime(w[2]\hat{\ }w[3])\hat{\ }w[3]\hat{\ }w[0]\hat{\ }w[1]$$

$$m[3]=xtime(w[3]\hat{\ }w[0])\hat{\ }w[0]\hat{\ }w[1]\hat{\ }w[2]$$

$$m[4]=xtime(w[4]\hat{\ }w[5])\hat{\ }w[5]\hat{\ }w[6]\hat{\ }w[7]$$

$m[5]=\text{xtime}(w[5]\hat{~}w[6])\hat{~}w[6]\hat{~}w[7]\hat{~}w[4]$ $m[6]=\text{xtime}(w[6]\hat{~}w[7])\hat{~}w[7]\hat{~}w[4]\hat{~}w[5]$ $m[7]=\text{xtime}(w[7]\hat{~}w[4])\hat{~}w[4]\hat{~}w[5]\hat{~}w[6]$ $m[8]=\text{xtime}(w[8]\hat{~}w[9])\hat{~}w[9]\hat{~}w[10]\hat{~}w[11]$ $m[9]=\text{xtime}(w[9]\hat{~}w[10])\hat{~}w[10]\hat{~}w[11]\hat{~}w[8]$ $m[10]=\text{xtime}(w[10]\hat{~}w[11])\hat{~}w[11]\hat{~}w[8]\hat{~}w[9]$ $m[11]=\text{xtime}(w[11]\hat{~}w[8])\hat{~}w[8]\hat{~}w[9]\hat{~}w[10]$ $m[12]=\text{xtime}(w[12]\hat{~}w[13])\hat{~}w[13]\hat{~}w[14]\hat{~}w[15]$ $m[13]=\text{xtime}(w[13]\hat{~}w[14])\hat{~}w[14]\hat{~}w[15]\hat{~}w[12]$ $m[14]=\text{xtime}(w[14]\hat{~}w[15])\hat{~}w[15]\hat{~}w[12]\hat{~}w[13]$ $m[15]=\text{xtime}(w[15]\hat{~}w[12])\hat{~}w[12]\hat{~}w[13]\hat{~}w[14]$ In consideration of the sequence of subscripts, in this embodiment, xtime is calculated as follows:

$m[i]=\text{xtime}(w[i]\hat{~}w[ofs1(i)])\hat{~}w[ofs1(i)]\hat{~}w[ofs2(i)]\hat{~}w[ofs3(i)]$ FIG. 34 is a diagram in which the detailed edition dummy codes are rewritten as a status transition table. FIG. 35 is a diagram showing a reading manner of each item in the status transition table. Specifically, code is a code of a function (command) to be executed in each status out of five commands, read is set as 1 when reading out data from the storage device 600, and set as 0 when not reading out, write is set as 1 when writing data into the storage device 600, and set as 0 when not writing into, and func is set in any one of LD, XTIME, SBOX, XOR, and arbitrary (operation by ALU 420 is not executed). Further, acc_we is set as 1 when writing data into the accumulator 430, and set as 0 when not writing into.

For example, at state=S01, a code "ld m[i]" is executed. At this time, read signal is set at 1, write signal is set at 0, func is set at LD, and acc_we is set at 1. Further, the output of the address generating unit 414 is PM in page and ix in offset. Because column ix and column round are vacant, nothing is executed in these columns. The control column is "↓" and it is changed to S02 as a next status.

At S03, column ix is ix+1, and the control is if (ix!=15) S01. It means that the value of ix is incremented by 1 to become ix+1, and that the status is changed to S01 if the value of ix before updating is not 15. When the value of ix is 15, the status is changed to a next status S04. As shown in FIG. 34, ix is updated at the timing of changing the data subject to each arithmetic processing.

(Modified Example of Third Embodiment)

FIG. 36 is a block diagram showing an example of a configuration of an address generating unit 414-2 in a modified example of the third embodiment. As shown in FIG. 36, the address generating unit 414-2 includes kp801, sr802, ofs810, and a selector 821-2.

In this modified example, instead of three offset output circuits, ofs1, ofs2, and ofs3, one circuit ofs810 is provided. This ofs810 is a circuit for converting the counter value ix by using one of three functions, ofs (x, 1), ofs (x, 2), and ofs (x, 3). A signal for designating one of the three functions ofs ( x, 1), ofs (x, 2), and ofs (x, 3) (1 to 3 in FIG. 36) is designated, for example, from the controller 411. FIG. 37 is a diagram showing an example of input and output of functions corresponding to the circuits in FIG. 36.

Selector 821-2 selects and issues one of 0, count value ix, output of kp801, output of sr802, and output of ofs810 according to the instruction from the controller 411. In such a configuration, a same function as that in FIG. 31 can be realized as well.

Thus, in the arithmetic device (encrypting device) in the third embodiment, by making use of the storage device outside the device, the data to be used in the operation is controlled to be stored in the storage device. As a result, the storage device is not needed in the AES operation circuit, and the size of the circuit is further reduced. In this embodiment, meanwhile, only circuits (XTIME, SBOX, XOR) least necessary for executing the arithmetic processing used in encryption is provided in the ALU, the apparatus can also be reduced in size in this point. Also in this embodiment, arithmetic processes used in encryptions are executed in a specified number of times. For example, every time the index register counts 15, that is, in the unit of 16 times, each operation is executed. Accordingly the control circuit necessary when the number of times is not matched is eliminated, a further reduction of size is realized.

(Fourth Embodiment)

In a fourth embodiment, examples in which an arithmetic device is applied in a decoding device of AES encrypting system are explained. FIG. 38 is a block diagram showing an example of a configuration of a decoding device 400-2 in the fourth embodiment. As shown in FIG. 38, the decoding device 400-2 includes a decoding unit 410-2, an ALU (arithmetic logic unit) 420-2 as an operator, and an accumulator 430.

The decoding unit 410-2 controls the operation of decoding process of AES encryption, and issues a status signal showing the status of the operation. The accumulator 430 is a register for storing the operation result by the ALU 420.

The ALU 420-2 executes the operation according to the information expressing the function selected by the decoding unit 410-2. The ALU 420-2, as required, executes the operation on the data at the address designated by the decoding unit 410-2.

In the embodiment, dummy codes in decoding processing in the AES encrypting system are explained. First, dummy codes simplifying the decoding process (simple edition dummy codes) are described.

```
//m=invAES (m,k)
//input m: cipher text k: decoding key
round=0;
rc=0x36;
m=AK (m,k) //AddRoundKey
while (1) {
k=iKS (k) //invKeyExpansion
m=iSB (m) //invSubBytes
w=iSR (m) //invShiftRows
round=round+1
if (round==10) break; //exit while loop
w=AK (w,k) //AddRoundKey
m=iMC (w) //invMixColumns
rc=ixtime (rc) //rc update
}
m=AK (w,k) //AddRoundKey
```

The functions having "i" added to the beginning of the functions used in the encrypting process are inverse functions of the functions used in the encrypting process. For example, iSB is an inverse function of SB.

iKS can be created from sbox and xor. iSB requires an inverse function of sbox (isbox). iMC can be created from xtime. Ixtime can be created from xtime. Therefore, the ALU 420-2 is enough to have five circuits for executing the following operations.

(1) LD
(2) XTIME
(3) SBOX
(4) ISBOX
(5) XOR

FIG. 39 is a block diagram showing an example of a configuration of the ALU 420-2 in the fourth embodiment having such a configuration. As shown in FIG. 39, the ALU 420-2 includes XTIME 421, SBOX 422, XOR 423, selector 424-2, and ISBOX 425. The ISBOX 425 is a circuit for executing an operation corresponding to an inverse function of SBOX 422.

The decoding unit 410-2 controls the operation of the ALU 420-2 so as to realize decoding process of these dummy codes. The decoding unit 410-2 includes a controller 411 same as in the encrypting unit 410, a round counter 412, an index register 413, and an address generating unit 414. The decoding unit 410-2 executes a decoding process of AES encryption in a same manner as in execution of the encrypting process by the encrypting unit 410. Also, the encrypting process can be executed in the configuration of ALU 420-2 shown in FIG. 39. In this case, the operation is executed as explained in FIG. 25, and the function selection of ISBOX is not designated.

Referring now to FIG. 40, the decoding process by the decoding device 400-2 in the fourth embodiment having such a configuration is explained. FIG. 40 is a flowchart showing a flow of entire decoding process in the fourth embodiment.

First of all, the round number counter (round) and the round constant (rc) are respectively initialized to 0 and 0x36 (36 of hexadecimal notation) (step S9001). Next, inverse AddRoundKey (iAK) is executed, and the message m is updated (step S9002). Then, inverse KeyExpansion (iKS) (step S9003), inverse SubBytes (iSB) (step S9004), and inverse ShiftRows (iSR) (step S9005) are executed sequentially, and 1 is added to the round number (step S9006).

If the round number does not reach 10 (No at step S9007), further AddRoundKey (step S9008), inverse MixColumns (iMC) (step S9009), and inverse xtime (ixtime) (step S9010) are executed. Afterwards, returning to step S203, the process is repeated. When the round number reaches 10 (Yes at step S9007), AddRoundKey is executed (step S9011), and the decoding process is terminated.

As explained herein, according to the first to fourth embodiments, the storage device for storing the data to be used in arithmetic processing is not needed in the arithmetic device, and the device can be reduced in size. For example, when an AES operation circuit is provided in the memory card, the AES operation circuit can be further reduced in size.

The foregoing embodiments also include following aspects.

(1) An arithmetic device connected to a storage device for storing N pieces of data in each type of data in continuous addresses, and executing an operation in a predetermined encrypting system, including:

an operator for executing a plurality of arithmetic processes used in the encrypting system, an address generating unit for generating an address for the storage device storing the data to be used in the arithmetic processing, based on the offset by reference to the upper bits of the address of the data at the beginning of the N pieces of the data of the types used in the arithmetic processing, and the address of the data at the beginning as the data corresponding to the counter value updated according to an instruction, and a controller for controlling the arithmetic unit so as to execute the arithmetic process in the sequence determined in the encrypting system, and updating the counter value at the timing for changing the type of the data used in the arithmetic processing, and the timing of changing the data used in the arithmetic processing.

(2) In the arithmetic device in the mode of (1), the encrypting system is the AES (Advanced Encryption Standard) encrypting system.

(3) In the arithmetic device in the mode of (2), the plurality of arithmetic processes are sbox, xtime, and xor determined by the AES encrypting system, and the loading process of reading the data from the storage device.

(4) In the arithmetic device in the mode of (2), the plurality of arithmetic processes are sbox, isbox, xtime, and xor determined by the AES encrypting system, and the loading process of reading the data from the storage device.

(Fifth Embodiment)

A configuration of a semiconductor device in a fifth embodiment is described below while referring to FIG. 38. FIG. 38 is a block diagram of a memory system in the embodiment. In the fifth embodiment, an example of applying the semiconductor device in the foregoing embodiments in a memory card is described.

As shown in FIG. 38, a memory card 300, which is a memory system, is connected to a host device 200 by way of a connector 13. The host device 200 has hardware and software for accessing the memory card 300 connected by way of the connector 13. The memory card 300 operates by receiving power supply when connected to the host device 200, and processes according to the access from the host device 200.

The memory card 300 is, for example, an SD memory card loaded and used in the host device 200, and utilized as an external storage device of the host device 200. The host device 200 includes, for example, a personal computer for processing video data, music data or other various data, or an information processing device including a digital camera.

In this embodiment, the memory system may be composed by including the host device in which the memory card 300 is applied, or not in a form of a card, the memory system may be composed by incorporating a flash memory and a controller for controlling the flash memory into the host device. The host device 200 includes, a PDA, an electronic book, a digital video, a mobile telephone, or other electronic appliance aside from those mentioned above The memory card 300 gives and receives information with the host device 200 by way of the connector 13. The memory card 300 includes a memory part (nonvolatile semiconductor storage part) 11 as a NAND type flash memory chip (merely called NAND type flash memory, flash memory, or NAND chip), a memory controller (card controller) 12 for controlling the memory part 11, and a connector 13 constituted of a plurality of signal pins (pin 1 to pin 9).

The connector 13 is electrically connected to the memory controller 12. An assignment of signals in the pins 1 to 9 in the connector 13 is, for example, as shown in FIG. 39. FIG. 39 is a table showing the pins 1 to 9, and the assigned signal. In FIG. 39, SD mode (1 bit, 4 bits) and SPI mode are operation modes of data transfer defined in the standard of the SD memory card. The transfer mode of the memory card 300 may be called differently depending on the transfer clock frequency, for example, normal speed mode (or NSM) supporting up to the maximum 25 MHz, high speed mode (or HSM) supporting to the maximum of 50 MHz, or ultrahigh speed mode (UHSM) supporting up to the maximum of 104 MHz.

Data DAT0, DAT1, DAT2, and DAT3 are assigned respectively to pin 7, pin 8, pin 9, and pin 1. Pin 1 is assigned also to card detection signal CD. Command CMD, and response RES as a response signal of the memory card 300 corresponding to this command CMD are assigned to pin 2. Clock signal CLK is assigned to pin 5. Supply voltage VDD is assigned to pin 4, grounding voltage VSS to pin 3, and grounding voltage VSS2 to pin 6, respectively.

The memory card 300 can be inserted into a slot provided in the host device 200. The host controller (not shown) provided in the host device 200 communicates various signals and data with the memory controller 12 in the memory card 300 by way of the pins 1 to 9. For instance, when data is written into the memory card 300, the host controller transfers a write command to the memory controller 12 as a serial signal by way of the pin 2. At this time, the memory controller 12 takes in the write command given to the pin 2, in response to the clock signal supplied to the pin 5.

In the SD mode for transferring data in the unit of 4-bit bus width (SD 4-bit mode), four pins for data, that is, pin 1, pin 7, pin 8, and pin 9 are all used for data transfer. On the other hand, in the SD mode for transferring data in the unit of 1-bit bus width (SD 1-bit mode), only pin 7 is used for data transfer, and pin 8 and pin 9 for data are not used. Pin 1 is specified to be used only for asynchronous interruption, for example, from the memory card 300 to the host device 200.

The SPI mode is a transfer mode in 1-bit bus width, and pin 7 is used in a data signal line (DATAOUT) from the memory card 300 to the host device. Pin 2 is used in a data signal line (DATAIN) from the host device 200 to the memory card 300. Pin 8 and pin 9 are not used. In the SPI mode, pin 1 is specified to be used in transmission of chip select signal CS from the host device 200 to the memory card 300.

Whether the SD mode is used or the SPI mode is used is determined at the time of initialization of the memory card 300. In the SD mode, the 1-bit mode or the 4-bit mode is selected by a command from the host (SET BUS WIDTH).

As mentioned above, the write command is serially entered into the memory controller 12 by using pin 2 only. This pin 2 assigned for command input is disposed between pin 1 and pin 3 for grounding potential Vss as shown in FIG. 39. That is, the connector 13 is used for communication between the host controller in the host device 200 and the memory controller 300.

By contrast, communication between the memory unit 11 and the controller 12 is executed by the memory interface part for NAND type flash memory (hereinafter merely called NAND bus or NAND interface) 21. Therefore, although not shown in the drawing, the memory unit 11 and the memory controller 12 are connected, for example, by way of an 8-bit input/output (I/O) line.

In the memory interface part 21, the command and the data to the memory unit 11 are transmitted by sharing the same I/O line. Thus, the interface (connector 13) of communication between the host controller in the host device 200 and the memory cared 300, and the interface (NAND bus 21) of communication between the memory unit 11 and the memory controller 12 are different from each other.

An internal structure of the memory controller of the memory card 300 shown in FIG. 38 is explained by referring to FIG. 40. FIG. 40 is a block diagram of the memory card 300.

The memory unit 11 is a nonvolatile semiconductor memory, which is constituted of a plurality of NAND chips (NAND chips corresponding to the foregoing embodiments). Data and others transmitted from the host device 200 are stored in this memory unit 11. Control programs and other firmware (system information) or the like may be also stored.

The connector 13 is connected to the memory controller 12 by way of a bus 14. The bus 14 includes a CLK line, a CMD/RES line, a DAT0 line, a DAT1 line, a DAT2 line, a CD/DAT3 line, a VDD line, a VSS1 line, and a VSS2 line. The memory controller 12 is connected to the memory unit 11 by way of, for example, a bus of 8-bit bus width.

The memory controller 12 manages the physical status in the memory unit 11 (for example, which-number logical sector address is contained in which-number physical block address, or which block can be erased). The memory controller 12 includes an external interface part 15, a command controller 16, a data controller 17, an MPU (micro-processing unit) 18, a ROM (read-only memory) 19, a RAM (random access memory) 20, a memory interface part 21, and a timer (measuring part) 22.

The external interface part 15 processes an interface between the memory controller 12 and the host device 200. More specifically, the external interface part 15 is a functional block which is connected to the host device 200 by way of the connector 13, and transmits and receives commands and various data according to a specified protocol under the control of the MPU (controller) 18.

The command controller 16 receives a command CMD transmitted from the host device 200, and interprets this command CMD. Further, the command controller 16 generates a response RES as a response signal to this command CMD, and transmits this response RES to the host device 200.

The data controller 17 transmits and receives data based on the command CMD transmitted from the host device 200. The data controller 17 further generates status data (STATUS) showing the operation status of the memory card 300 or the like, and transmits the status data to the host device 200.

The MPU 18 is to control the entire operation of the memory card 300. More specifically, the MPU 18 reads out the firmware (system information) stored in the ROM 19 or the memory unit 11 when power is supplied to the memory card 300 and sends into the RAM 20, and executes a specified processing, so that various tables are created in the RAM 20. Further, the MPU 18 receives a write command, a read command, an erase command and others from the host device 200, and executes a specified processing on the memory unit 11, or controls data transfer process via the bus. For example, when writing data, a write command is issued. The write command is, for example, "80h" or "10h" specified in the NAND interface. The MPU 18 has a timer controller (measurement controller) 18a for controlling the timer 22. This timer controller 18a is capable of setting the measurement time in the timer 22, or controlling the MPU or the memory interface part 21 by a time measurement completion signal from the timer 22. More specifically, the timer controller 18a controls the memory interface part 21, and controls (delays) the execution of transfer of write command issued by the MPU 18 or input of data (data in). The timer controller 18a may also supply the measurement completion signal to the MPU 18. The timer controller 18a may be also provided outside of the MPU 18.

The ROM 19 is a memory for storing firmware and others executed by the MPU 18. The RAM 20 is used as a working area of the MPU 18, and is a memory for storing firmware and various tables (lists). The memory interface part 21 is a functional block for interface processing between the memory controller 12 and the memory unit 11.

The memory interface part 21 receives time measurement completion signal or the like, for example, from the timer controller 18a, and transfers the write command issued by the MPU 18 to the memory unit 11, or enters the data (data in). In FIG. 40, the MPU 18 and the memory interface part 21 are shown as different circuit blocks, but a function for issuing a write command in the MPU 18, for example, may be included in the memory interface part 21.

The timer 22 measures (counts) the time as a minimum unit, from rise to fall of one clock (CLK). The timer 22 notices the end to the timer controller 18a when measurement of time is over.

The memory controller 12 includes a buffer not shown in the drawing, and is capable of temporarily storing a specific amount of data when writing the data sent from the host device into the memory unit 11, when storing a specific amount of data (for example, data for one page), or when sending the data being read out from the memory unit 11 into the host device 200.

Referring next to FIG. 41, a configuration of the memory unit 11 is schematically described. FIG. 41 is a block diagram of the memory unit 11. As shown in the drawing, the memory unit 11 has a plurality of (for example, n pieces from chip 1 to chip n–1) NAND chips (NAND chips corresponding to the foregoing embodiments) 11a.

According to this embodiment, it is known that the NAND chips in the foregoing embodiments can be also mounted on the memory card and others.

<Modified Examples and Others>

Incidentally, the foregoing embodiments can be combined and executed in various forms, and in particular, when the first to fourth embodiments are combined and used, the area of the AES encrypting operation circuit can be further suppressed.

In each embodiment, instead of the AES encrypting circuit 122, an arithmetic device such as encrypting device, ECC, or security system may be used.

In the fifth embodiment, the SD card is used and explained, but other memory card, memory device, or internal memory, or other semiconductor storage device may be used as far as the operation is the same, and the same effects and actions as in the foregoing embodiments may be obtained. The memory cell array 130 is not limited to the NAND type flash memory, but other semiconductor memories may be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonvolatile semiconductor storage device comprising:
   an encrypting circuit to execute an operation of a predetermined encrypting system,
   a memory cell array preliminarily storing complementary data to be used in the operation,
   a page buffer comprising a first region for storing the data being read out from the memory cell array, and a second region used at the time of execution of the operation,
   a register to store the data from the first region, and supplying the stored data into the second region,
   an inspection circuit to judge presence or absence of error in the data when storing the data into the register, and store the data into the register when the data is judged to be free from error,
   a control circuit to control reading out of the data from the memory cell array into the first region, and reading out of the data from the first region into the second region, and
   an address control circuit to designate an address of the page buffer or the memory cell array, based on a signal supplied from the control circuit,
   wherein the control circuit controls the address control circuit, and supplies the data from the first region into the second region, and
   when the inspection circuit detects an error in the data, it is notified to the address control circuit, and
   the address control circuit receives the notice, and designates other address in which data of same contents as the data in the page buffer is stored, and thereby
   the inspection circuit judges presence or absence of error in the data in the other address.

2. A nonvolatile semiconductor storage device comprising:
   an encrypting circuit to execute an operation of a predetermined encrypting system,
   a memory cell array preliminarily storing data to be used in the operation, the memory cell array including memory cells, bit lines, and word lines, the word lines being each connected to gates of the memory cells, the bit lines being each connected to one end of a corresponding one of the memory cells,
   a page buffer comprising a first region to store the data being read out from the memory cell array, and a second region used at the time of execution of the operation, the page buffer including buffer circuits corresponding to the bit lines, and
   a register to store the data from the first region, and supply the stored data into the second region,
   wherein the nonvolatile semiconductor storage device is a NAND flash memory device.

3. The device according to claim 2, further comprising:
   an inspection circuit to judge presence or absence of error in the data when storing the data into the register, and store the data into the register when the data is judged to be free from error.

4. The device according to claim 3, further comprising:
   a control circuit to control reading out of the data from the memory cell array into the first region, and reading out of the data from the first region into the second region, and
   an address control circuit to designate an address of the page buffer or the memory cell array, based on a signal supplied from the control circuit,
   wherein the control circuit controls the address control circuit, and supplies the data from the first region into the second region, and
   when the inspection circuit detects an error in the data, it is notified to the address control circuit, and
   the address control circuit receives the notice, and designates other address in which data of same contents as the data in the page buffer is stored, and thereby
   the inspection circuit judges presence or absence of error in the data in the other address.

5. The device according to claim 4, wherein the control circuit supplies the data stored in the register into the second region prior to the operation.

6. The device according to claim 5, wherein the control circuit performs the operation by using the data when the data is stored in the second region.

7. The device according to claim 6, wherein the control circuit judges presence or absence of error in the data about all addresses in which data of same contents as the data is stored, and stores the data in the register when the data is judged to contain an error.

8. The device according to claim 7, wherein the encrypting circuit performs the operation by using the data judged to contain an error.

9. The device according to claim 8, wherein a time required for the operation by the encrypting circuit using the data judged to contain an error, and a time required for the operation by the encrypting circuit using the data judged to contain no error are the same.

10. The device according to claim 9, wherein the operation result contains information about presence or absence of error in the data.

11. The device according to claim 2, wherein the operation result is stored in the second region.

12. The device according to claim 2, wherein the data includes two types, slot key and media key.

13. The device according to claim 12, wherein when both the slot key and the media key are stored in the second region, the encrypting circuit performs the operation by using the slot key and the media key.

14. The device according to claim 12, wherein the control circuit causes the inspection circuit to judge presence or absence of error in the slot key, and to judge presence or absence of error in the slot key.

15. The device according to claim 12, wherein the register has the storage region at least equal in size to the data length of the slot key.

16. The device according to claim 2, wherein the data is complementary data.

17. The device according to claim 2, further comprising:
an operation unit provided between the memory cell array and the page buffer,
wherein the operation unit performs a part of the operation executed by the encrypting circuit.

* * * * *